United States Patent
Curry

(10) Patent No.: US 7,455,033 B2
(45) Date of Patent: *Nov. 25, 2008

(54) THROW TOY FOR REDUCED RISK OF ANIMAL INJURY

(76) Inventor: Jon K. Curry, 2899 W. Conestoga Ct., Chino Valley, AZ (US) 86323

( * ) Notice: Subject to any disclaimer, the term of this patent is extended or adjusted under 35 U.S.C. 154(b) by 2 days.

This patent is subject to a terminal disclaimer.

(21) Appl. No.: 11/123,573

(22) Filed: May 6, 2005

(65) Prior Publication Data

US 2005/0268861 A1 Dec. 8, 2005

Related U.S. Application Data

(63) Continuation-in-part of application No. 10/854,548, filed on May 26, 2004, now Pat. No. 7,201,117, which is a continuation-in-part of application No. 11/093,629, filed on Mar. 30, 2005.

(51) Int. Cl.
*A01K 29/00* (2006.01)
(52) U.S. Cl. .................................... 119/709; 119/707
(58) Field of Classification Search ............... 119/707, 119/709–711
See application file for complete search history.

(56) References Cited

U.S. PATENT DOCUMENTS

| 4,770,123 A * | 9/1988 | Bell ........................... 119/709 |
| 5,560,320 A * | 10/1996 | Plunk ........................ 119/709 |
| 6,615,766 B1 * | 9/2003 | Curry ........................ 119/207 |

* cited by examiner

*Primary Examiner*—Bret Hayes
(74) *Attorney, Agent, or Firm*—Tod R. Nissle, P.C.

(57) ABSTRACT

A method and apparatus for reducing the risk that a thrown toy will injure an animal. The apparatus consists of a toy which when thrown bounces erratically, which compressively elastically deforms, which includes a soft fabric outer surface that compresses to absorb blows, and which can withstand being bitten or chewed by a dog.

14 Claims, 24 Drawing Sheets

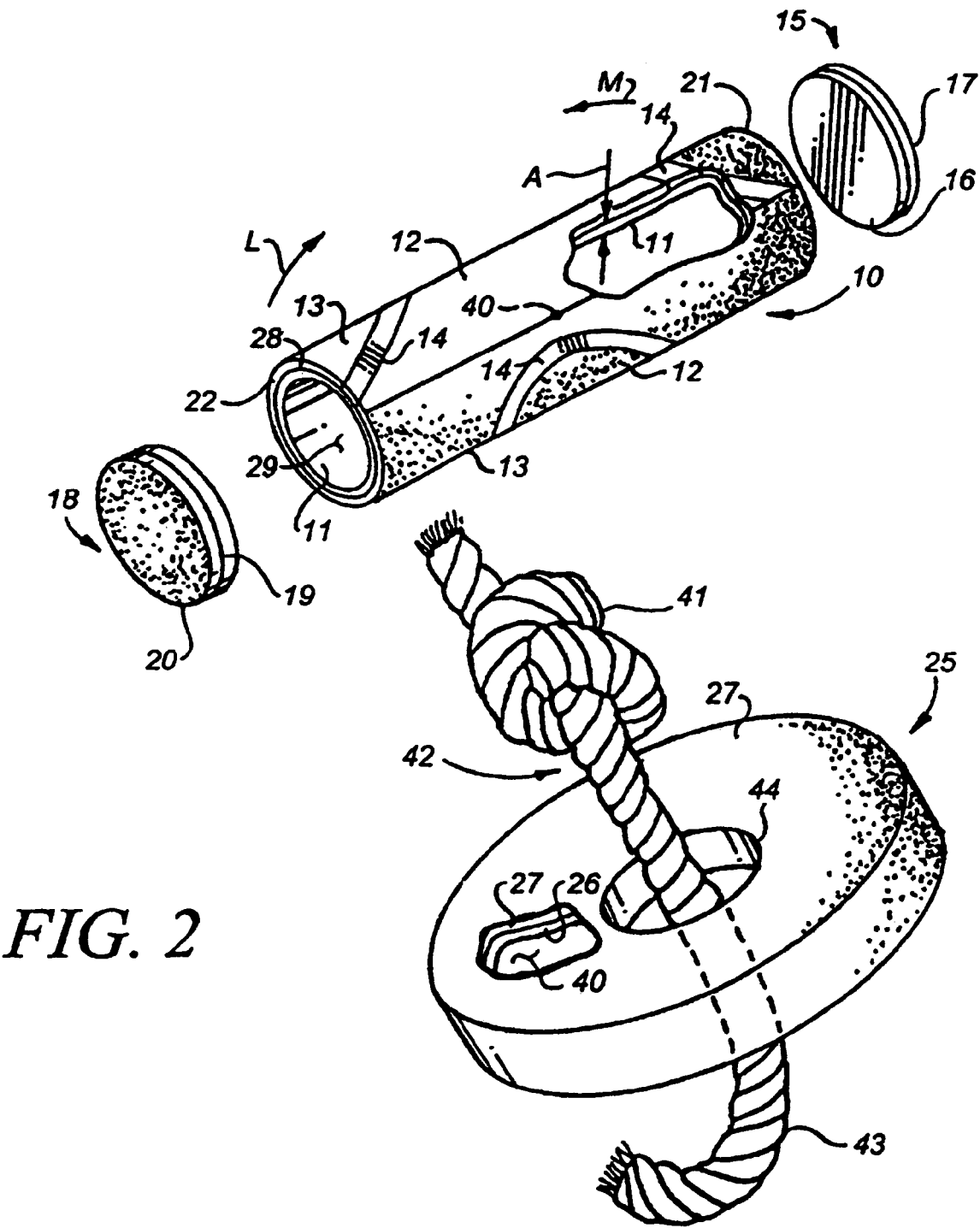

```
┌─────────────────────────────────────────────────────────────┐
│ MOLD TOP HALF AND BOTTOM HALF OF TOY WITH DIAPHRAGM         │
│ FORMED INTERMEDIATE ENDS OF EACH HALF SO THAT               │
│ DIAPHRAGM DIVIDES INNER HOLLOW AREA INTO TWO                │
│ COMPARTMENTS, ONE TO BE SEALED WHEN THE TOP AND             │
│ BOTTOM HALVES ARE JOINED, THE OTHER COMPARTMENT NOT         │
│ SEALED                                                  250 │
└─────────────────────────────────────────────────────────────┘
                              │
                              ▼
┌─────────────────────────────────────────────────────────────┐
│ FORM ANCHOR AT DISTAL END OF ROPE                       251 │
└─────────────────────────────────────────────────────────────┘
                              │
                              ▼
┌─────────────────────────────────────────────────────────────┐
│ EXTEND PROXIMATE END OF ROPE THROUGH OPENING AT ONE END     │
│ OF TOP AND/OR BOTTOM HALF OF TOY SUCH THAT ANCHOR IS        │
│ POSITIONED IN UNSEALED COMPARTMENT OF TOY               252 │
└─────────────────────────────────────────────────────────────┘
                              │
                              ▼
┌─────────────────────────────────────────────────────────────┐
│ APPLY GLUE ALONG SEAM EDGE OF EACH HALF, PRESS HALVES       │
│ TOGETHER ALONG SEAM EDGES TO FORM MEMBER HAVING A SEAM      │
│ LINE, TO FORM A SEALED COMPARTMENT, AND TO FORM AN          │
│ UNSEALED COMPARTMENT WITH THE ANCHOR THEREIN            253 │
└─────────────────────────────────────────────────────────────┘
                              │
                              ▼
┌─────────────────────────────────────────────────────────────┐
│ PLACE HALVES IN MOLD TO HEAT AND CURE ADHESIVE          254 │
└─────────────────────────────────────────────────────────────┘
```

*FIG. 13*

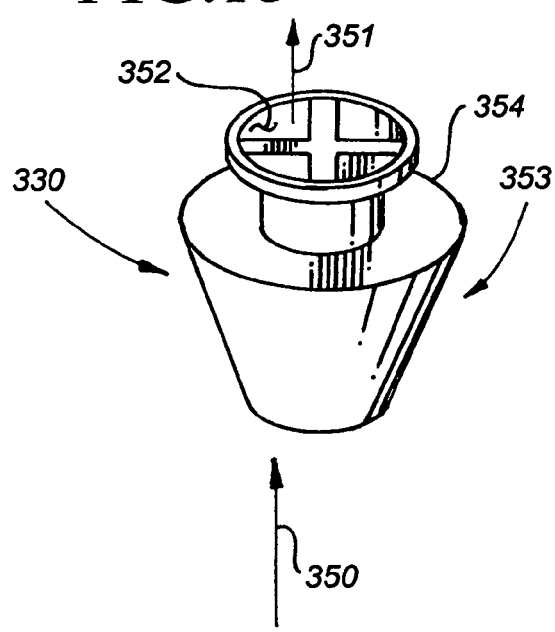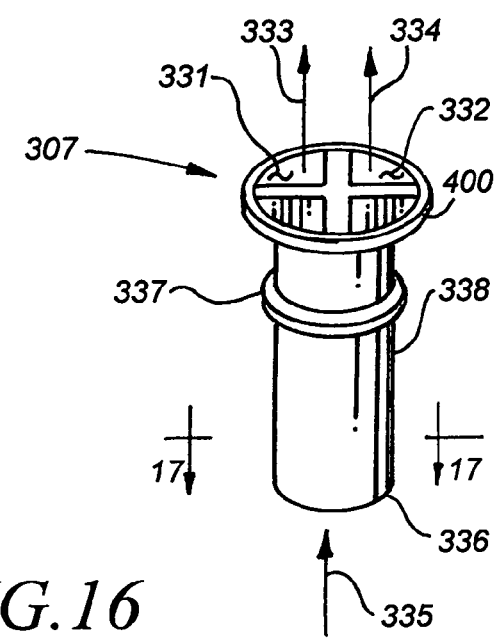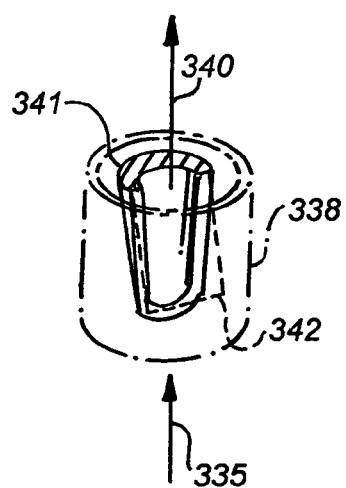

THROW TOY FOR REDUCED RISK OF ANIMAL INJURY

This application is a continuation-in-part of U.S. patent application Ser. No. 10/854,548, filed May 26, 2004 now U.S. Pat. No. 7,201,117, which is a continuation-in-part of U.S. patent application Ser. No. 11/093,629, filed Mar. 30, 2005, for "METHOD AND APPARATUS FOR REDUCING RISK THAT A THROWN TOY WILL INJURE AN ANIMAL".

This invention relates to toys.

More particularly, the invention relates to a toy for an animal.

In a further respect, the invention relates to an animal toy which when thrown can bounce erratically, which minimizes the probability of harm to an animal trying to catch a toy which has been thrown, which is symmetrical but is shaped to include points at varying distances away from the center of the toy to enable the toy to bounce erratically, which is permanently sealed so that the toy repeatedly compressively elastically deforms and bends in the same predictable manner, which includes a soft fabric outer surface that compresses to absorb blows and soften the impact when the toy hits an animal or other surface, and which can withstand being bitten or chewed by a dog and continue to function.

A wide variety of animal toys are known. One kind of toy is made of hard rubber and comes in a variety of shapes. For example, a dog bone made of hard, tough rubber has long been sold in retail outlets. A hard, tough rubber is utilized to make it difficult for a dog to chew through the bone. The rubber also adds weight to the toy, permitting the toy to be thrown long distances. Finally, the rubber material used to make the toy also enables the toy bone to bounce into the air. Dogs like chasing bouncing toys. While this type of toy is without question resistant to be damaged or chewed up, the toy is also dangerous. If the toy when thrown bounces into a dog, the toy can, due to its hardness, injure the animal. Worse, if the bone is thrown in the air and hits the dog straight away before the bone hits the ground, the dog can also be injured.

Animal toys can be constructed by attaching sections of felt fabric to the outer surface of a rubber shell such that the fabric sections are separated by a seam or strip of rubber or other polymer. In practice, the fabric sections are adhered or otherwise fastened to the rubber shell such that the edge of one piece of fabric is adjacent the edge of a second piece of fabric. The adjacent fabric edges define a rough seam line. A strip of rubber tape is attached to the pieces of fabric such that the tape covers the seam line. After the tape is attached, the entire rubber shell—fabric piece—rubber tape assembly is placed in a mold to melt and cure the rubber tape. A particular problem associated with this procedure is that the edges of the top and bottom portions of the mold tend to engage and stick to the rubber tape, pulling a large portion of the tape off the seam line.

One type of retrieval training toy comprises a piece of rope or cord attached to a plastic body or to a body comprises of a small canvas bag filled with a pliable material like sawdust, sand, small pieces of paper, etc. A trainer or other individual utilizes a retrieval toy by grasping the piece of rope and using the rope to throw the toy. The dog or other animal retrieving the toy takes the rope or body and carries the toy back to the trainer. These kinds of retrieval training toys ordinarily are not sealed or do not bounce Accordingly, it would be highly desirable to provide an improved dog's toy which can be thrown a long distance to bounce in an erratic pattern liked by dogs while producing only a small risk that the toy will injure a dog. It would also be highly desirable to provide an improved method for molding a dog's toy to minimize the quantity of rubber tape pulled off the seam line of the toy during molding of the toy to soften and cure the rubber tape.

Therefore, it is a principal object of the instant invention to provide an improved toy.

A further object of the invention is to provide an improved animal toy which reduces the risk that the toy will, when thrown, injure an animal chasing the toy.

Another object of the invention is to provide an improved animal toy which elastically compresses and bends to minimize the risk of injury to an animal.

Still another object of the invention is to provide an improved method of producing an animal toy which reduces the likelihood that polymer seam tape will significantly damaged during molding.

Still a further object of the invention is to provide an improved retrieval toy which includes a throw-rope attached to a toy body, which is sealed, and which bounces.

Yet another object of the invention is to provide an improved method for manufacturing a pliable retrieval toy of the type including a throw-rope attached to a toy body.

These and other, further and more specific objects and advantages of the invention will be apparent to those skilled in the art from the following detailed description thereof, taken in conjunction with the drawings, in which:

FIG. 1 is a perspective view of a hollow elastic fabric-covered toy constructed in accordance with the principles of the invention;

FIG. 2 is a perspective view of another hollow elastic fabric-covered toy constructed in accordance with the principles of the invention;

FIG. 13 is a block flow diagram illustrating a method for fabricating the toy of FIGS. 10 to 12;

FIG. 15 is a perspective view illustrating a sound device that can be utilized in the animal toy of FIG. 14;

FIG. 16 is a perspective view illustrating another sound device that can be utilized in the animal toy of FIG. 14;

FIG. 17 is a section view illustrating additional construction details of the sound device of FIG. 16 and taken along section line 17-17 thereof;

Figure 3:
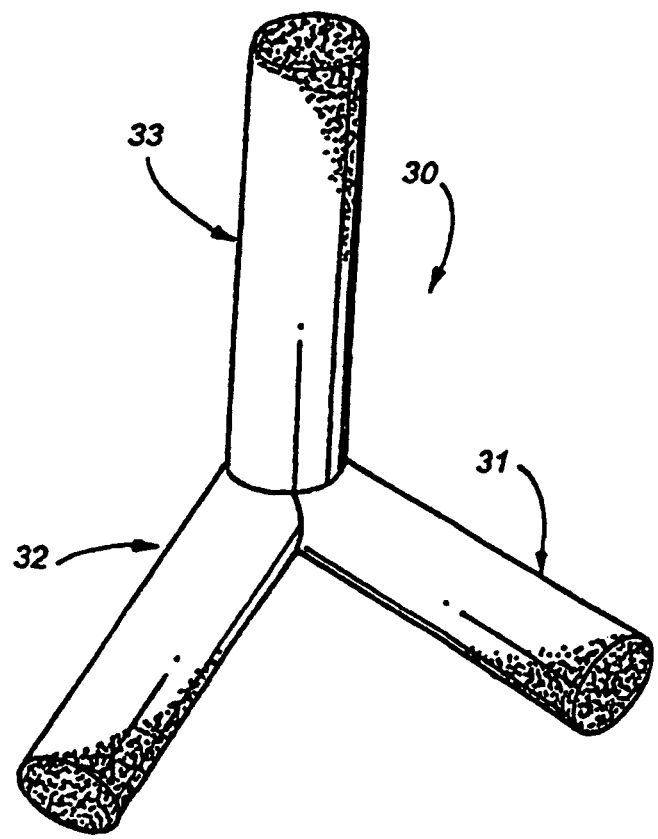
FIG. 3 is a perspective view of still another hollow, elastic fabric-covered toy constructed in accordance with the principles of the invention.

Briefly, in accordance with the invention, an improved animal toy is provided. The toy includes a compressibly elastically deformable hollow thin-walled rubber core sealingly circumscribing and enclosing a selected compressible gaseous volume. The rubber core includes a center, an outer surface, a wall less than about five-sixteenths of an inch thick, and points on the outer surface at varying distances from the center. A felt cover is affixed to the outer surface of the core. At least one elongate strip of material extends over the outer surface as a line of demarcation to separate the felt cover into at a least two areas, one on either side of the strip of material.

In another embodiment of the invention, an improved animal toy is provided. The toy includes a compressibly elastically deformable hollow thin-walled rubber core sealingly circumscribing and enclosing a selected compressible gaseous volume. The rubber core includes a center; an outer surface; a wall less than about five-sixteenths of an inch thick; points on the outer surface at varying distances from the center; and, an inner wall portion circumscribing an aperture extending completely through the core. A felt cover is affixed to the outer surface of the core.

In a further embodiment of the invention, an improved animal toy is provided. The toy includes a compressibly elastically deformable thin-walled hollow symmetrical rubber core sealingly circumscribing and enclosing a selected compressible gaseous volume. The rubber core includes a center; an outer surface; a wall less than about five-sixteenths of an inch thick; and, points on the outer surface at varying distances from the center. A felt cover is affixed to the outer surface of the core. The symmetrical core is shaped and dimensioned such that the toy can be thrown to bounce along a straight line, and such that the direction of travel of the toy changes from bounce to bounce.

In still another embodiment of the invention, an improved animal toy is provided. The toy includes a compressibly, elastically deformable thin-walled hollow rubber core sealingly circumscribing and enclosing a selected compressible gaseous volume. The rubber core includes a center; an outer surface; a wall less than about five-sixteenths of an inch thick; points on the outer surface at varying distances from the center; and, an inner wall portion circumscribing an aperture extending completely through the core. The core is shaped and dimensioned such that the toy when thrown randomly bounces erratically. A felt cover is affixed to the outer surface of the core. A length of rope extends through the aperture such that the rope can be grasped to throw the toy.

In yet another embodiment of the invention, an improved animal toy is provided. The toy includes a compressibly, elastically deformable thin-walled hollow rubber core sealingly circumscribing and enclosing a selected compressible gaseous volume. The rubber core includes a center; an outer surface; a wall less than about five-sixteenths of an inch thick; and, points on the outer surface at varying distances from the center. The core is shaped and dimensioned such that the toy when thrown randomly will bounce erratically. A felt cover is affixed to the outer surface of the core and includes a plurality of fibers forming a soft compressible layer adjacent the outer surface.

In still yet another embodiment of the invention, an improved animal toy is provided. The toy includes an elongate compressibly, elastically deformable bendable thin-walled hollow rubber core sealingly circumscribing and enclosing a selected compressible gaseous volume. The core includes a center; an outer surface; a wall less than about five-sixteenths of an inch thick; and, points on the outer surface at varying distances from the center. The core is shaped and dimensioned such that the toy when thrown randomly will bounce erratically. A felt cover is affixed to the outer surface of the core and includes a plurality of fibers forming a soft compressible layer adjacent the outer surface.

In a further embodiment of the invention, an improved animal toy is provided. The improved animal toy includes a compressibly elastically deformable hollow thin-walled rubber core sealingly circumscribing and enclosing a selected compressible gaseous volume and including a center, an outer surface, a wall less than about eight millimeters thick, and points on the outer surface at varying distances from the center; includes a felt cover affixed to the outer surface of the core and having a selected thickness, the ratio of the thickness of said felt cover to the thickness of said wall being in the range of 1:6 to 1:0.15; and, includes at least one elongate strip of material extending over the outer surface as a line of demarcation to separate the felt cover into at least two areas, one on either side of the strip of material.

In another embodiment of the invention, an improved animal toy is provided. The improved toy includes a compressibly elastically deformable hollow thin-walled rubber core sealingly circumscribing and enclosing a selected compressible gaseous volume and including a center; an outer surface, a wall less than about five-sixteenths of an inch thick; points on the outer surface at varying distances from the center; and, at least one arcuate outer edge generally having a radius of at least three-quarters of an inch; and, a felt cover affixed to the outer surface of the core. The felt cover has a thickness greater than about two millimeters.

In still a further embodiment of the invention, an improved animal toy is provided. The improved animal toy includes a compressibly elastically deformable thin-walled hollow symmetrical rubber core sealingly circumscribing and enclosing a selected compressible gaseous volume and including a center, an outer surface, a wall less than about five-sixteenths of an inch thick, and points on the outer surface at varying distances from the center. The improved toy also includes at least one arcuate edge including an area of weakness which reduces the force required to deform the edge; and, a felt cover affixed to the outer surface of the core.

In yet another embodiment of the invention, an improved method for producing an animal toy is provided. The improved method includes the steps of forming the top half of the toy; forming the bottom half of the toy; fastening together the top half and the bottom half along a seam line to form a unitary member; applying polymer tape along the seam line; applying a felt cover to the top half such that at least a portion of the edge of the cover overlaps the polymer tape; applying a felt cover to the bottom half such that at least a portion of the edge of the cover overlaps the polymer tape, the unitary member, polymer tape and felt covers collectively forming a moldable member; and, molding the moldable member to soften and cure the polymer tape and to draw together the edges of the felt covers.

In another embodiment of the invention, an improved animal toy is provided. The toy includes a compressibly elastically deformable hollow thin-walled elastomer core sealingly circumscribing and enclosing a selected compressible gaseous volume and including a center, an outer surface, a wall less than about eight millimeters thick, and points on the outer surface at varying distances from the center; includes a fabric cover affixed to the outer surface of the core and having a selected thickness, the ratio of the thickness of the fabric cover to the thickness of the wall being in the range of 1:6 to 1:0.15; and, includes at least one elongate strip of material extending over the outer surface as a line of demarcation to separate the fabric cover into at least two areas, one on either side of the strip of material.

In a further embodiment of the invention, an improved method for producing an animal toy is provided. The improved method includes the steps of forming the top half of the toy; forming the bottom half of the toy; fastening together the top half and the bottom half along a seam line to form a unitary member; applying polymer tape along the seam line; applying a fabric cover to the top half such that at least a portion of the edge of the cover overlaps the polymer tape; applying a fabric cover to the bottom half such that at least a portion of the edge of the cover overlaps the polymer tape, the unitary member, polymer tape and fabric covers collectively forming a moldable member; and, molding the moldable member to soften and cure the polymer tape and to draw together the edges of the fabric covers.

In still another embodiment of the invention, an improved animal toy is provided. The toy includes a first compartment; a second compartment; a diaphragm separating the first and second compartments; a compressibly elastically deformable hollow elastomer thin wall less than about eight millimeters thick, having an outer surface, having a center, having points on the outer surface at varying distances from the center, and sealingly circumscribing and enclosing a selected compressible gaseous volume in the first compartment, and circumscribing and at least partially enclosing the second compartment; an aperture formed through the thin wall in the portion of the wall circumscribing the second compartment; a rope having an intermediate portion, a proximate end positioned outside the first and second compartment, and a distal end formed as an anchor and positioned in the second compartment such that the intermediate portion of the rope extends from the distal end outwardly through the aperture to the proximate end; and, a fabric cover affixed to the outer surface of the wall.

In still a further embodiment of the invention, an improved method for producing an animal toy is provided. The method includes the steps of forming the top half of the toy, the top half including a first diaphragm portion dividing the top half into two portions; forming the bottom half of the toy, the bottom half including a second diaphragm portion dividing the bottom half into two portions and shaped to join with the first diaphragm portion when the halves are mated; providing a length of rope with a proximate end and a distal end; forming an anchor at the distal end; fastening together the top half and bottom half along a seam line to form a unitary member with the first and second diaphragm portions in registration and joined to divide said unitary member into at least a first sealed compartment and a second unsealed compartment, with the anchor in the unsealed compartment, and with the proximate end positioned outside the first and second compartments and the unitary member; and, applying a fabric cover to the unitary member.

In yet another embodiment of the invention, an improved animal toy is provided. The toy includes a compressibly deformable thin wall circumscribing and enclosing a selected volume at least partially filled with a gas, the volume including a center, the wall including an outer surface and being less than about eight millimeters thick, the outer surface including points at varying distances from the center; an aperture formed through the wall; and, a rope having an intermediate portion, a proximate end positioned outside the core, and a distal end formed as an anchor and positioned inside the wall that the intermediate portion of the rope extends from the distal end outwardly through the aperture to the proximate end, the anchor being shaped and dimensioned to prevent the anchor from passing through the aperture.

In another embodiment of the invention, an improved method for producing an animal toy is provided. The method includes the steps of forming the top half of the toy; forming the bottom half of the toy; providing a diaphragm portion; providing a length of rope with a proximate end and a distal end; forming an anchor at the distal end; assembling the top half, the bottom half, and the diaphragm to form a unitary member. In the unitary member, the diaphragm divides the unitary member into at least a first sealed compartment and a second unsealed compartment, the anchor is in the unsealed compartment, and, the proximate end is positioned outside the first and second compartments and the unitary member. The method also includes the step of applying a fabric cover to the unitary member. When the diaphragm portion is supplied prior to assembly of the unitary member, the diaphragm portion can be an integral portion of the top half or the bottom half or can be separate from the top half and the bottom half.

In a further embodiment of the invention, an improved method for producing an animal toy is provided. The method includes the steps of forming the top half of the toy; forming the bottom half of the toy; fastening together the top half and the bottom half along a seam line to form a unitary member; applying a first fabric cover to the top half, the cover including an edge; applying a second fabric cover to the bottom half, said second cover including an edge; and, molding the top half, bottom half, and fabric covers to draw together the edges of the fabric covers.

In still another embodiment of the invention, an improved animal toy is provided. The toy includes a first compartment; a second compartment; a diaphragm separating the first and second compartments; and, a compressibly elastically deformable hollow elastomer thin wall. The wall is less than about eight millimeters thick; has an outer surface; has a center; has points on the outer surface at varying distances from the center; sealingly circumscribes and encloses a selected compressible gaseous volume in the first compartment; and, circumscribes and at least partially encloses the second compartment. The toy also includes at least two apertures formed through the thin wall in the portion of the wall circumscribing the second compartment; and, a rope. The rope has an intermediate portion extending through the apertures; has a first end positioned outside the first and second compartments; and, has a second end positioned outside of the first and second compartments. The toy also includes a fabric cover affixed to the outer surface of the wall.

In still a further embodiment of the invention, we provide an improved animal toy. The toy includes a compressibly elastically deformable hollow thin-walled elastomer core circumscribing and enclosing a selected compressible gaseous volume and including a center, an outer surface, a wall less than about eight millimeters thick, and, points on the outer surface at varying distances from the center; includes a fabric cover affixed to the outer surface of the core and having a selected thickness, the ratio of the thickness of the fabric cover to the thickness of the wall being in the range of 1:6 to 1:0.15; includes at least one elongate strip of material extending over the outer surface as a line of demarcation to separate the fabric cover into at least two areas, one on either side of said strip of material; includes at least one aperture formed through the core; and, includes a hollow sound device mounted in the core for producing a sound audible to a dog when air travels through the sound device at a selected rate of flow.

In yet a further embodiment of the invention, we provide an improved method for producing an animal toy, including the steps of forming the core of the toy; applying a fabric cover to the core; forming an aperture through the core; inserting in the aperture a hollow sound device to produce a sound audible to a dog when air travels through the sound device at a selected rate of flow.

In yet another embodiment of the invention, we provide an improved animal toy. The animal toy includes a first compartment; a second compartment; a diaphragm separating the first and second compartments; and, a compressibly elastically deformable hollow elastomer thin wall less than about eight millimeters thick. The wall has an outer surface, has a center, circumscribes and encloses a selected compressible gaseous volume in the first compartment, and circumscribes and at least partially encloses the second compartment. The toy also includes at least one aperture formed through the thin wall in a portion of the wall circumscribing the second compartment; and, a rope. The rope has an intermediate portion; a proximate end positioned outside the first and second compartments; and, a distal end formed as an anchor and positioned in the second compartment such that the intermediate portion of the rope extends from the distal end outwardly through the aperture to the proximate end. The toy also includes a fabric cover affixed to the outer surface of the wall; at least one aperture formed through the thin wall in a portion of the wall circumscribing the first compartment; and, a hollow sound device for producing a sound audible to a dog when air travels through the sound device at a selected rate of flow.

In yet still a further embodiment of the invention, we provide an improved method for producing an animal toy. The method includes the steps of forming the core of the toy; applying with heat and pressure a fabric cover to the core; forming an aperture through the core and the fabric; inserting in the aperture a hollow sound device to produce a sound audible to a dog when air travels through the sound device at a selected rate of flow; and, covering the hollow sound device with fabric material.

In yet still another embodiment of the invention, we provide an improved animal toy including a compressibly elastically deformable thin-walled polymer core circumscribing and enclosing a selected compressible gaseous volume and including a center, an outer surface, and a wall; including a fabric cover affixed to the outer surface of the core and having a selected thickness, the fabric cover including a plurality of fibers formed a soft compressible layer adjacent said outer surface; including an aperture formed through the core; and, including a hollow sound device inserted in the aperture to produce a sound audible to a dog when air travels through the sound device at a selected rate of flow. The wall of the core has a thickness in the range of 0.0016 m to 0.0078 m. The core is shaped and dimensioned such that the toy, when thrown, will bounce erratically. The ratio of the thickness of said fabric cover to the thickness of the wall can be in the range of 1:3 to 1.5:1. The ratio of the thickness of the fabric cover to the thickness of the wall can be in the range of 1:2 to 1:1. The felt cover can have a thickness greater than about two millimeters. The toy can include an arcuate edge having a radius of at least 01.0188 m. The fabric cover can have a thickness in the range of 0.002 m to 0.006 m. The core can have a thickness in the range of 0.002 m to 0.006 m. The core can be symmetrical.

In a further embodiment of the invention, we provide an improved animal toy. The toy includes a compressibly elastically deformable hollow thin-walled elastomer core circumscribing and enclosing a selected gaseous volume and including a center, an outer surface, and a wall; a fabric cover affixed to the outer surface of said core and having a selected thickness; at least one elongate strip of material extending over outer surface as a line of demarcation to separate fabric cover into at least two areas, one on either side of the strip of material; at least one aperture formed through said core; and, a temperature resistant hollow sound device mounted in the core for producing a sound audible to a dog when air travels through the sound device at a selected rate of flow.

In another embodiment of the invention, we provide an improved method for producing an animal toy. The method includes the steps of forming the core of the toy with an aperture; inserting a temperature resistant squeaker the aperture; applying adhesive and a fabric cover to the core; and, heating the core, adhesive, and fabric to an elevated temperature greater than two hundred degrees F.

In still a further embodiment of the invention, we provide an improved method for producing an animal toy. The method includes the steps of forming the core of the toy including an aperture, and a thin puncturable sheet of material covering the aperture; applying a fabric cover to the core; inserting in the aperture a hollow sound device to puncture the sheet and to produce a sound audible to a dog when air travels through the sound device at a selected rate of flow.

In still another embodiment of the invention, we provide an improved animal toy. The toy includes a compressibly elastically deformable hollow thin-walled elastomer core circumscribing and enclosing a selected gaseous volume and including a center, an outer surface, and a wall; at least one flange outwardly extending from the core; and, a fabric cover affixed to the outer surface of the core only and having a selected thickness. The toy can also include at least one elongate strip of material extending over the outer surface as a line of demarcation to separate the fabric cover into at least two areas, one on either side of the strip of material.

In yet another embodiment of the invention, we provide an animal toy including a housing; and, a sound module mounted on the housing to produce a plurality of sounds each comprised of two or more randomly selected, different, and combined sounds.

In yet a further embodiment of the invention, we provide an animal toy comprising a compressibly elastically deformable hollow thin-walled elastomer core circumscribing and enclosing a selected gaseous volume and including a center, an outer surface, and a wall; a rope having a first distal end and having a second proximate end embedded in said core; and, a fabric cover affixed to the outer surface of the core and having a selected thickness.

Turning now to the drawings, which describe the presently preferred embodiments of the invention for the purpose of illustrating the practice thereof and not by way of limitation of the scope of the invention, and in which like characters refer to corresponding elements throughout the several views, FIG. 1 illustrates a toy including a hollow cylindrical rubber core 11. If desired, supporting walls can be formed inside of hollow core 11 much like bulkheads are formed inside the hollow hull of a ship. Pieces 12, 13 of felt or another desired fabric are adhesively secured or otherwise affixed to the outer cylindrical surface 28 of core 11. Fabric pieces 12, 13 are shaped and dimensioned and applied to surface 28 such that a space or groove of substantially constant width between the pieces 12, 13 is formed. This track is filled with an elastic rubber material to form strip 14. Alternatively, one or more fabric pieces can be utilizes to complete cover surface 28, after which a strip 14 of material can be attached on or in the fabric to form a strip 14 dividing the fabric into sections on either side of the strip 14. Strip 14 presently has a width in the range of one-sixteenth to seven-sixteenths (1.5 mm to 10.5 mm) of an inch, preferably one-sixteenth to five-sixteenths (1.5 mm to 7.5 mm) of an inch.

Cylindrical end piece 18 includes rubber piece 19 and fabric piece 20 adhesively secured or otherwise secured to piece 19. End piece 18 is secured to circular end surface or lip 22.

Cylindrical end piece 15 includes rubber piece 16 and fabric piece 17 adhesively secured or otherwise secured to piece 17. End piece 15 is secured to circular end surface or lip 21.

After end pieces 15 and 18 are secured to the ends of core 11, rubber pieces 19 and 16 and core 11 circumscribe and seal closed cylindrical volume 29.

The fabric used to cover surface 28 is presently preferably felt because felt provides a soft surface which reduces the strength of a blow to an animal when the toy inadvertently strikes an animal. Felt also resiliently compresses to absorb some of the force of the blow. While any felt can be utilized, the preferred felt comprises a firm woven cloth of wool or cotton heavily napped and shrunk to form a smooth resilient texture.

The core 11 of the toy of the invention must be fabricated from rubber because core 11 must be able to be elastically compressed. As used herein, the term rubber includes natural or synthetic rubbers and polymers or other components which produce materials having the properties of a rubber.

Since the wall of hollow core 11 must have "give", it is important in the practice of the invention that the wall be relatively thin. The thickness, indicated by arrows A in FIG. 1, of the wall of core 11 is in the range of about one-sixteenth of an inch to five-sixteenths of an inch, preferably one-sixteenth of an inch to three-sixteenths of an inch.

At the same time, the rubber utilized to make core 11 must be relatively tough so that a dog or other animal cannot with its teeth readily puncture core 11.

Another important feature of the toy of the invention is that core 11 must sealingly circumscribe a gaseous volume 29. Volume 29 ordinarily is filled with air, but nitrogen or any other desired gas can be utilized. It is acceptable for the gas to have some moisture content; however, filling volume 29 with a fluid is not presently preferred because the fluid can add substantial weight to the toy and because the fluid does not compress as readily as a gas. After core 11 and end pieces 15 and 18 are assembled and sealingly enclose volume 29, additional gas can, if desired, be added to volume 29 to pressurize volume 29. Any desired method can be utilized to pressurize volume 29. For example, a composition can be put into volume 29 during manufacture. After member 11 and pieces 15 and 18 are assembled to sealingly enclose volume 29 and enclose the composition in volume 29, the assembled unit is heated to cause the composition to release gas to pressurize volume 29.

Pressurizing volume 29 is preferred because the pressure helps to support the wall of core 11 while still not preventing the wall of core 11 from being elastically compressed.

The center point 40 of the toy of FIG. 1 is circumscribed by and spaced apart from the cylindrical wall of core 11. Point 40 is also equidistant from each end piece 15, 18. The center point of a toy constructed in accordance with the invention is generally at an average distance from points, lines, or angle on the exterior of the toy. It is important that each toy include points on its exterior which are not equidistant from the center point of the toy. This construction insures that the toy will have the ability to bounce erratically. A toy with all surface points equidistant from the center of the toy is not utilized in the practice of the invention.

As earlier noted, elastic core 11 can be compressed, i.e., the cylindrical wall of core 11 can be elastically pushed inwardly. Another important feature which can be incorporated into toys constructed in accordance with the invention is that they can be bent. In FIG. 1 for example, after the toy is assembled, end piece 18 can be moved in the direction of arrow L simultaneously with the movement of end 15 in the direction of arrow M. When an object is bent, part of the object is subject to tensile forces while another opposed part of the object is subjected to compressive forces.

The hollow toy 25 illustrated in FIG. 2 includes a doughnut-shaped rubber core 26 which sealingly encloses gas-filled volume 40. Felt cloth 27 or other fabric substantially completely covers the outer surface of core 26 in the same manner that cloth pieces 12 and 13 cover substantially the entire outer surface 28 of the toy shown in FIG. 1. Cylindrical aperture 44 extends completely through toy 25. Knot 41 formed in rope 42 does not fit through aperture 25, which permits end 43 to be grasped manually so that the rope 42 and toy 25 can be twirled and thrown.

The toy 30 illustrated in FIG. 3 includes three hollow cylindrical legs 31, 32, 33 which co-terminate to form a three-legged toy. While the angles between legs can vary and the number of legs in the toy can vary, it is presently preferred that the legs 31 to 33 be normal to each other.

Figure 4:
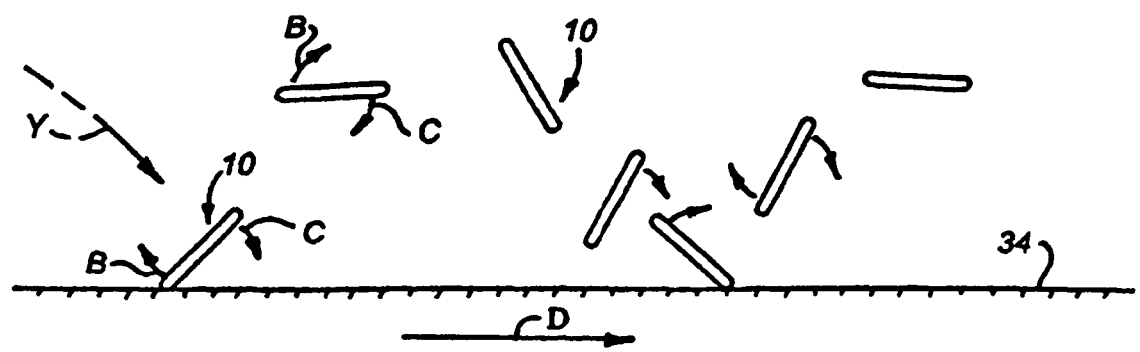
FIG. 4 is a side elevation view of the toy of FIG. 1 bouncing end-over-end in a constant fixed direction after being thrown and landing on the ground.

As used herein, when a toy is thrown "randomly", the toy is thrown without any attempt to control the orientation of the toy in the air. When the toys illustrated in FIGS. 1 to 3 are thrown randomly, it is highly likely that they will bounce erratically when they hit the ground. It is possible, however, for each toy to be thrown so it will not bounce erratically. For example, as shown in FIG. 4, the toy in FIG. 1 can be thrown end-over-end toward the ground in the direction of arrow Y, hit the ground, and continue to travel in the direction of arrow D. This does not constitute an erratic bounce because after the toy hits the ground it continues to travel in the same direction D.

Similarly, it is possible to throw the toy of FIG. 2 like a frisbee, such that the toy 25 hits or lands on the ground flat on one of its two opposed circular faces and stops dead. This does not constitute an erratic bounce because the toy 25 does not bounce. Throwing the toy to accomplish such a landing is difficult at best. Alternately, toy 25 can be thrown in a vertical orientation which causes it to land on edge on the ground and roll in a straight line. This is difficult to accomplish on a consistent basis, especially if rope 42 is still in the toy 25 when it lands. To insure that rope 42 stays in the toy, a knot can also be formed in end 43 which will not pass through aperture 44.

Throwing toy 30 of FIG. 3 so that it will not bounce erratically is difficult. It is possible to throw toy 30 so that it will make a three-point landing with the distal end of each leg 31 to 33 hitting the ground simultaneously or almost simultaneously so that toy 30 hits the ground and stops dead. Such a three point landing is highly unlikely.

As used herein, a toy has an erratic bounce when, after it hits the ground, it moves in a direction different from the direction it was traveling just prior to hitting the ground.

One important reason why toys with an erratic bounce are critical in the practice of the invention is that when a toy makes an erratic bounce the speed of travel of the toy after the bounce appears less, sometimes significantly less, than if the toy continues in the same direction of travel after the toy bounces. Since a primary object of the invention is to minimize the risk of injury to an animal, it is imperative that a toy not continue going in the same direction like a freight train after it hits the ground, but that some of the inertia of the toy be consumed by insuring that the toy bounce erratically. The ability of the toy to be compressed and to be bent on contacting the ground also consumes some of the toy's inertia.

Figure 5:
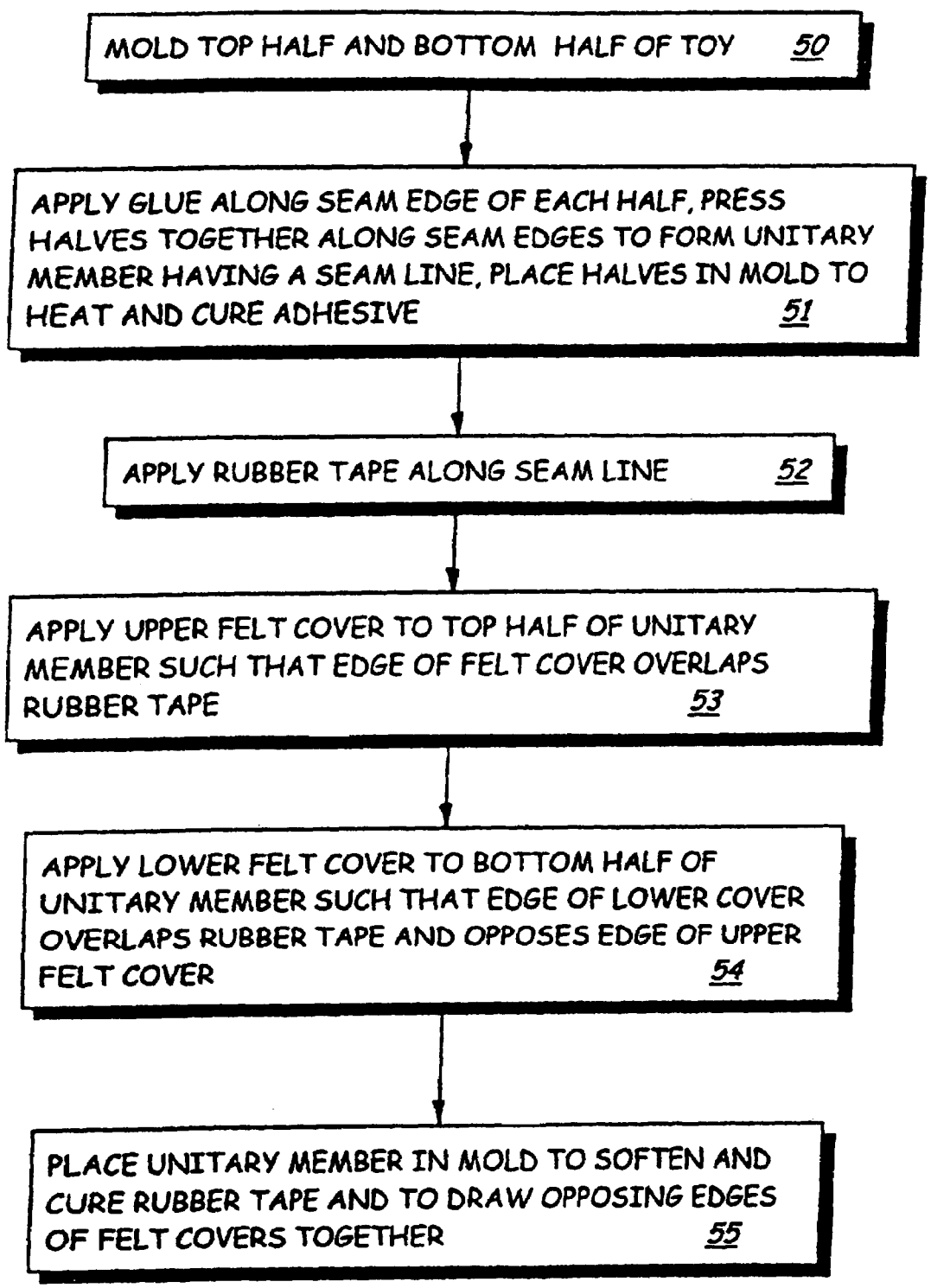
FIG. 5 is a block flow diagram illustrating a method for producing an animal toy in accordance with the invention.

An improved method for producing an animal toy is depicted in FIG. 5. The method includes the step 50 of "mold top half and bottom half of toy". If desired, methods other than molding can be utilized in step 50 to form the top and bottom halves of a toy.

Step 51 comprises "apply glue along seam edge of each half, press halves together along seam edges to form unitary member having a seam line, place halves in mold to heat and cure adhesive". Fasteners or methods other than gluing can be utilized to fasten together the top and bottom halves along a seam line.

Step 52 comprises "apply rubber tape along seam line". The tape can consist of any polymer or other material which is softened (by heating or any other desired method) and then hardens and cures.

Step 53 comprises "apply upper felt cover to top half of unitary member such that edge of felt cover overlaps rubber tape".

Step 54 comprises "apply lower felt cover to bottom half of unitary member such that edge of lower cover overlaps rubber tape and opposes edge of upper felt cover".

Step 55 comprises "place unitary member in mold to soften and cure rubber tape and to draw opposing edges of felt covers together".

Additional features of the invention, along with the method of FIG. 5, are further illustrated in FIGS. 6 to 9. The toy illustrated in FIGS. 6 to 9 has the shape of a dog bone, but the shape and dimension of toys made in accordance with the invention can vary as desired.

Figure 6:
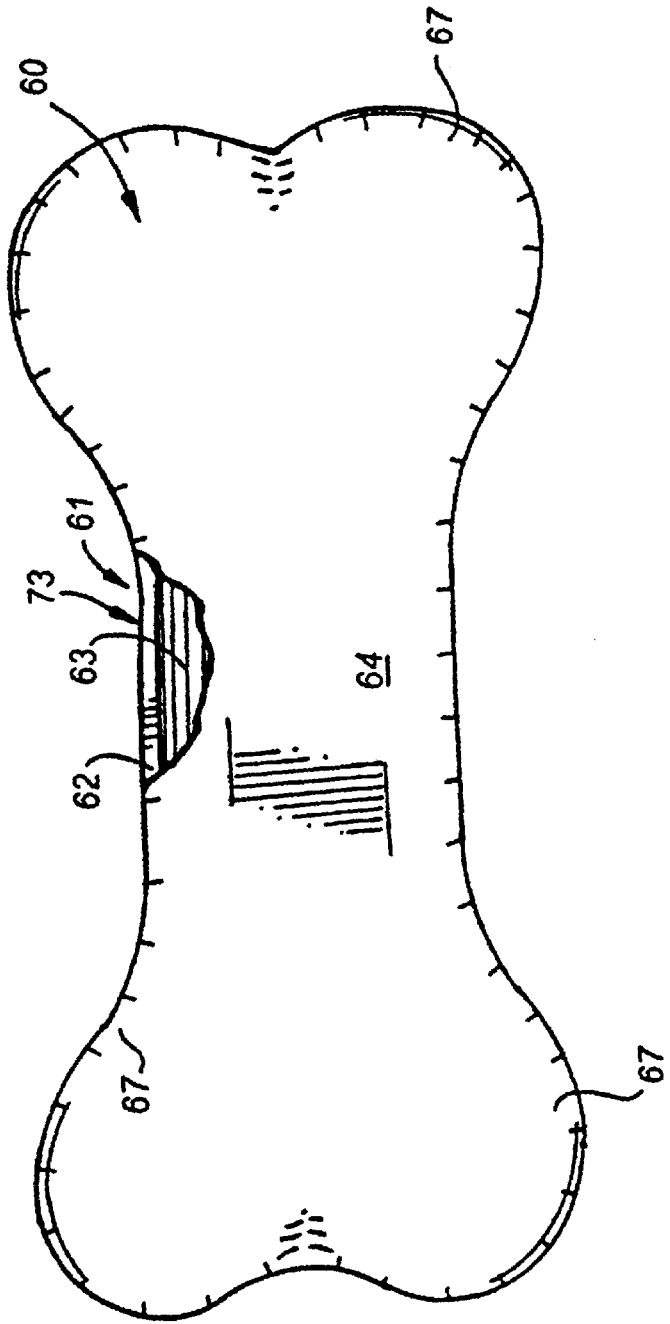
FIG. 6 is a top view of the top and bottom halves used in forming a toy in accordance with the method of FIG. 5.

Symmetrical hollow opposing halves 60 and 61 are illustrated in FIG. 6. Each half 60 and 61 is presently preferably molded from a rubber or polymer compound which, after being molded and cooled to ambient temperature (76 degrees F.) is bendable and resilient. The material and method utilized to manufacture each half can vary as desired.

Halve 60 includes generally flat upper area 64, front side 75, back side 74, inner surface 72, and edge 65. Arcuate edge 67 extends around halve 60. Halve 61 includes generally flat lower area 71, front side 76, back side 73, inner surface 63, and edge 62. Arcuate edge 70 extends around halve 61. Edge 62 opposes and has a shape, contour and dimension equivalent to the shape and dimension of edge 65.

Line of weakening or groove 85 extends along the inside of arcuate edge 67. Line of weakening or groove 86 extends along the inside of arcuate edge 70. Lines of weakening 85, 86 are important in the practice of one embodiment of the invention because they function to require less pressure be applied to deform edges 67 and 70, respectively, (and the felt covering edges 67 and 70) inwardly or outwardly. When less force or pressure is required to deform edges 67 and 70, it is less likely that edges 67 and 70 will cause injury when a toy constructed in accordance with the invention strikes an animal or human being. The lines of weakening can be formed in any desired manner. For example, instead of grooves 85, 86, perforations can be formed through edges 67 and 70 to remove material from and weaken edges 67 and 70. The lines of weakening can be formed on the inside of arcuate edges 67 and 70, on the outside of arcuate edges 67 and 70, through edges 67 and 70, etc.

The radius of curvature 66 of edges 67 and 70 can vary as desired. The radius of curvature of the edges of a toy which are on the outer surface of a toy and can contact the body of an animal or human being is, however, preferably ¾ of an inch or greater. A larger radius of curvature makes it less likely that an edge 67, 70 will penetrate and injure an eye or other part of the body of an animal or human being.

Figure 7:
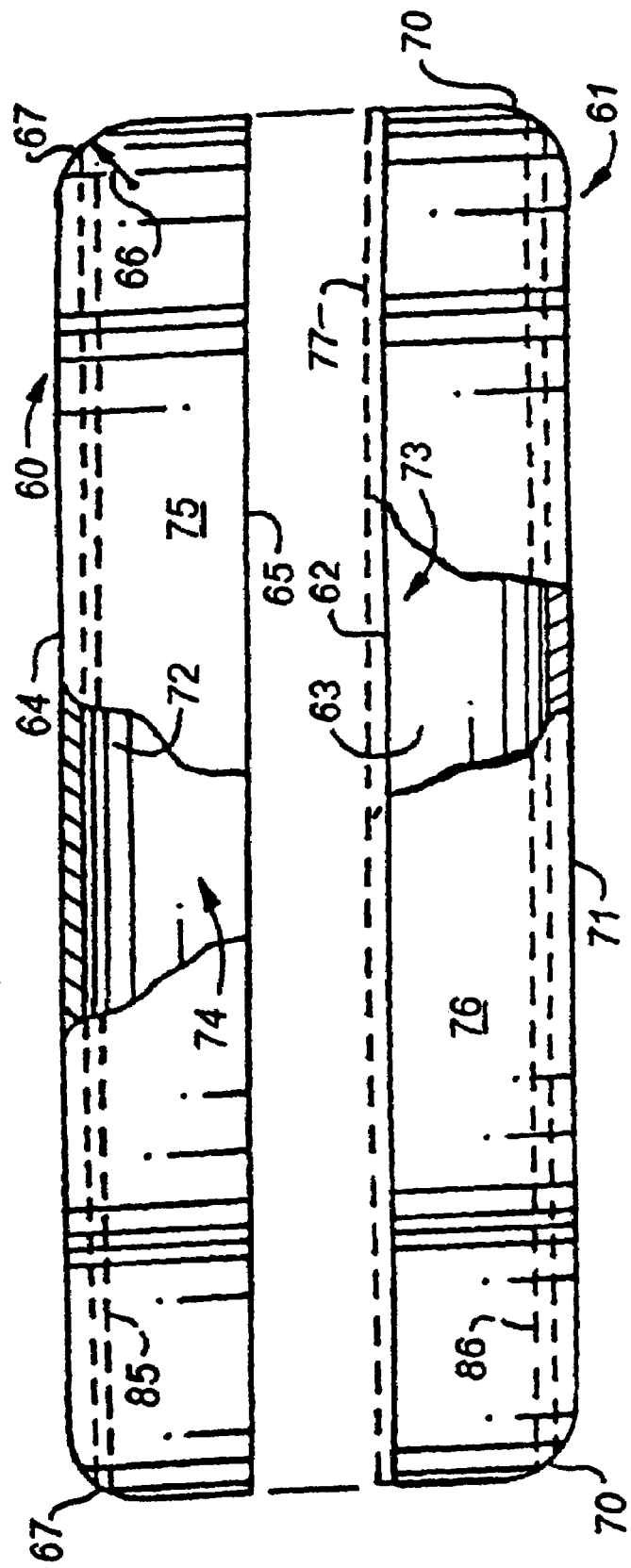
FIG. 7 is a side elevation assembly view of the top and bottom halves of FIG. 6 further indicating where adhesive is applied to affix the top and bottom halves to one another to form a seam line.

FIG. 7 also illustrates the top 60 and bottom 61 halves. In addition, dashed lines 77 in FIG. 7 illustrate adhesive which is placed on edge 62, and if desired on edge 65, to glue together halves 60 and 61 to form the seam line 79 illustrated in FIG. 8. After halves 60 and 61 are glued or otherwise fastened together, a strip of polymer or rubber is wrapped around and covers seam line 79. The polymer strip is indicated by dashed line 78 in FIG. 8. The polymer strip 78 can be sticky and adhere by itself to tops 60 and 61. Or, adhesive can be utilized to adhere strip 78 to tops 60 and 61. Or, some of the adhesive used to adhere the halves 60 and 61 may ooze out from seam line 79 and be used to adhere strip 78 to halves 60 and 61 over seam line 79. If desired, polymer strip 78 can be omitted.

Figure 8:
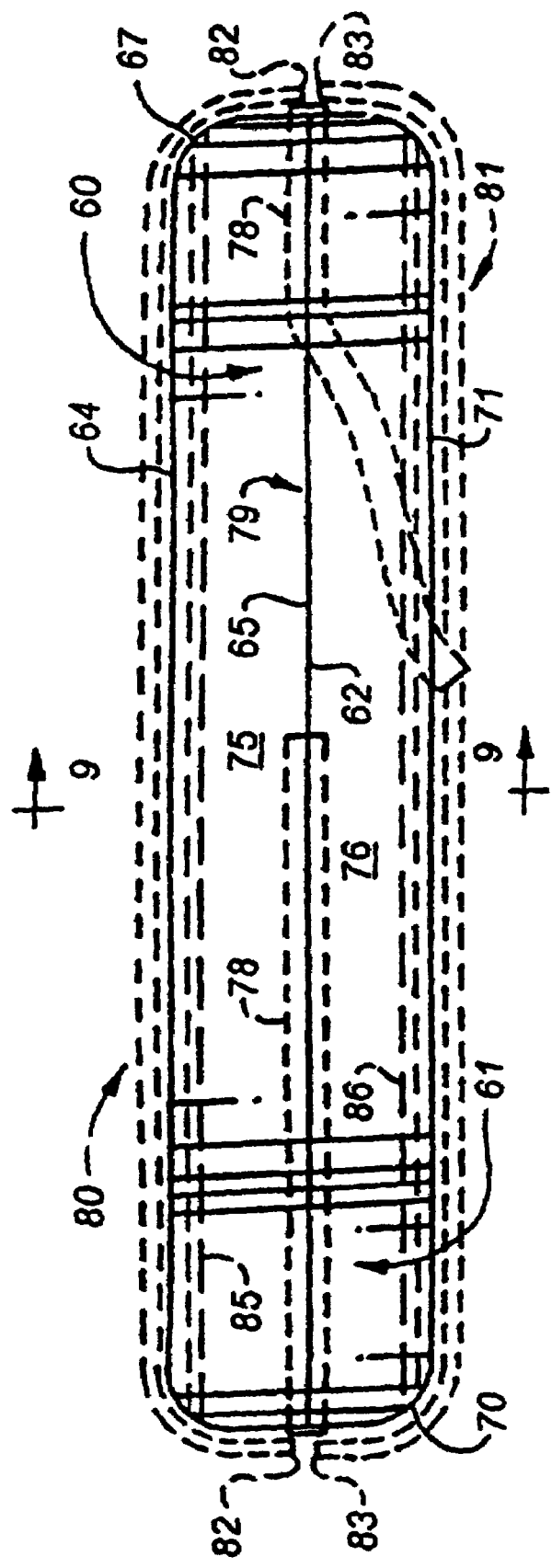
FIG. 8 is a side elevation view illustrating the top and bottom halves of FIGS. 6 and 7 after assembly, and indicating application of polymer tape along the seam line and of felt covers overlapping the polymer tape to produce a moldable member.
Figure 9:
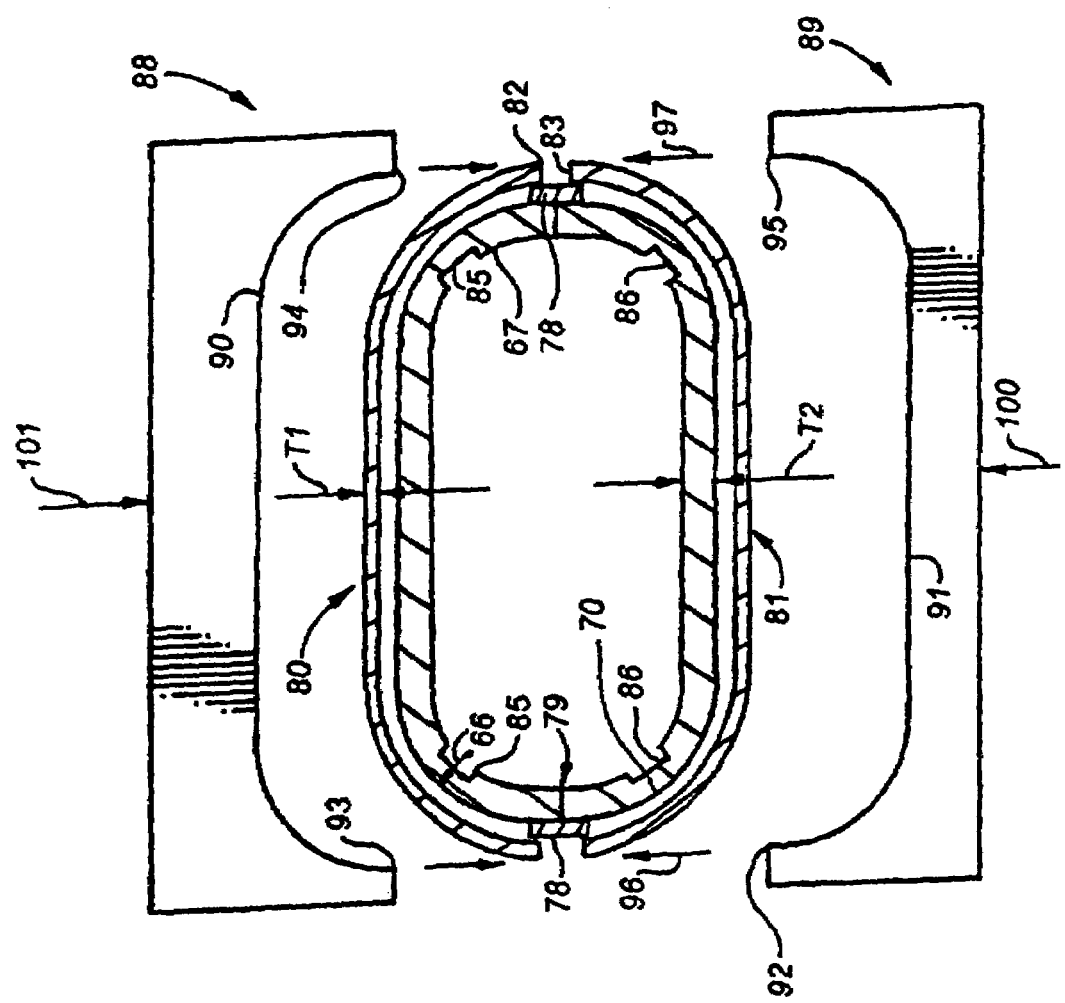
FIG. 9 is a section view of the moldable member of FIG. 8 taken along section lines 9-9 thereof and illustrating the molding of the moldable member to draw together the edges of the felt covers and to soften and cure the polymer tape.

Once strip 78 is fastened over seam line 79, a felt cover, indicated by dashed line 80 in FIG. 8 is placed over halve 60 such that edge 82 overlaps strip 78. A felt cover, indicated by dashed line 81 in FIG. 8 is placed over halve 61 such that edge 83 overlaps strip 78. Edges 82 and 83 are spaced apart as shown in FIG. 8. An adhesive (not shown) can be applied to covers 80, 81 or to halves 60, 61 to facilitate the adhering of the covers 80, 81 to the halves 60, 61.

Once the strip 78 and covers 80 and 81 are applied, the halves 60 and 61 are placed in a mold 88, 89. One or more mold parts 88 and 89 are moved to compress halves 60, 61 and covers 80, 81 in the directions indicated by arrows 100 and 101. Mold edges 92 to 95 engage edges 82 and 83 to stretch edges 82 and 83 toward one another in the directions indicated by arrows 96 and 97 in FIG. 9. Mold 88, 89 heats, softens, and cures the polymer or rubber in strip 78. Mold edges 92 to 95 also compress edges 82, 83 inwardly against strip 78 to facilitate the adhering of edges 92 and 95 to strip 78 when strip 78 softens. The mold 88, 89 also heats felt covers 80 and 81 to facilitate adherence of the covers 80 and 81 to halves 60 and 61. If strip 78 is omitted, mold edges 88, 89 compress opposing edges 82, 83 toward each other, preferably so the opposing edges abut.

Another method for applying rubber or polymer, either in place of or in conjunction with strip 78, is to prepare a stack of felt covers 80 and/or 81. The number of covers in the stack(s) can vary as desired, but presently there are about fifty covers in a stack. The edges of the covers in each stack collectively form the sides of the stack. Latex or another synthetic or natural rubber or polymer mixture is slathered or brushed onto the sides of the stack, i.e. is applied to the edges of the covers in the stack. The viscosity of the latex or other polymer mixture can vary as desired, but the mixture presently has a viscosity similar to that of honey. Covers 80 and 81 are peeled off each stack and applied to halves 60, 61. The mold edges 92 to 95 engage the edges 82 and 83 to stretch edges 82 and 83 toward one another in the directions indicated by arrows 96 and 97 in FIG. 9. Mold 88, 89 heats and cures the polymer or rubber that was applied to the edges of covers 80 and 81 while the covers were in a stack(s). Mold edges 92 to 95 compress edges 82, 83 inwardly toward one another. The polymer or rubber that was slathered on the edges 82, 83 functions to hold and seal edges 82, 83 adjacent one another.

The thickness, indicated by arrows T1, of the wall of halves 60 and 61 with respect to the thickness, indicated by arrows T2, of the felt covers 80, 81 is important in one embodiment of the invention. Many dog toys utilize heavy, thick, relatively hard rubber, probably with the intent of making it difficult for a dog to chew up the toy. Such rubber can, however, turn the toy into a dangerous projectile when the toy is thrown. I have discovered that utilizing a felt cover with a thickness in the range of 1.0 millimeters to 8.0 millimeters, preferably to 2.0 mm. To 6.0 mm., in combination with a resilient, pliable rubber or polymer material having a thickness in the range of only 1.0 to 8.0 mm, preferably 2.0 mm to 6.0 mm, produces a laminate having good "chew resistance" and having the additional feature of being quite safe because the thin, resilient polymer material is readily deformed and is not hard and because the thick felt tends to dissipate the forces produced when a dog or other animal bites the toy. Accordingly, the ratio of the thickness of the felt covers 80, 81 to the thickness of polymer material comprising halves 60 and 61 is in the range of 1:6 to 1:0.15, preferably 1:3 to 1:0.5.

Figure 10:
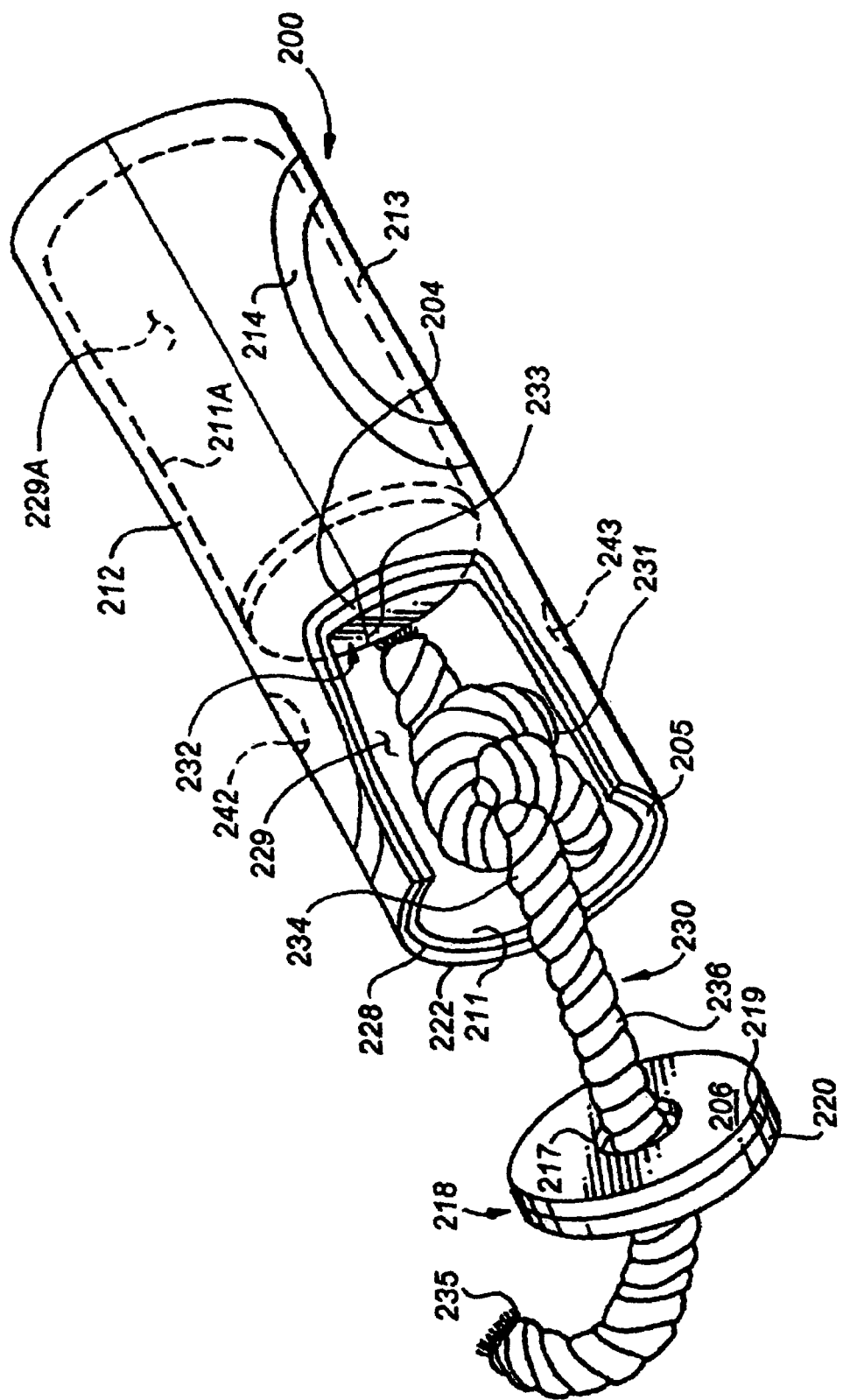
FIG. 10 is a perspective assembly view illustrating another embodiment of the invention utilized in training a dog or other animal or utilized during play with an animal.
Figure 12:
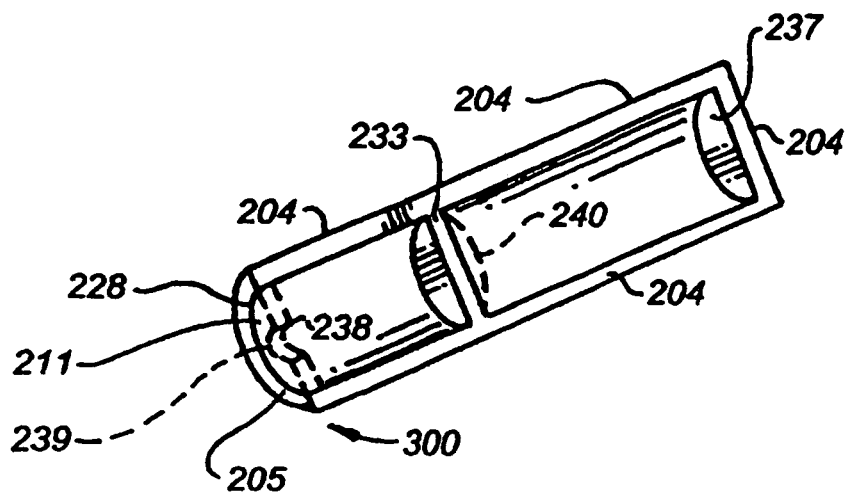
FIG. 12 is a perspective view illustrating a molded rubber component utilized in producing the training toy of FIG. 10.
Figure 11:
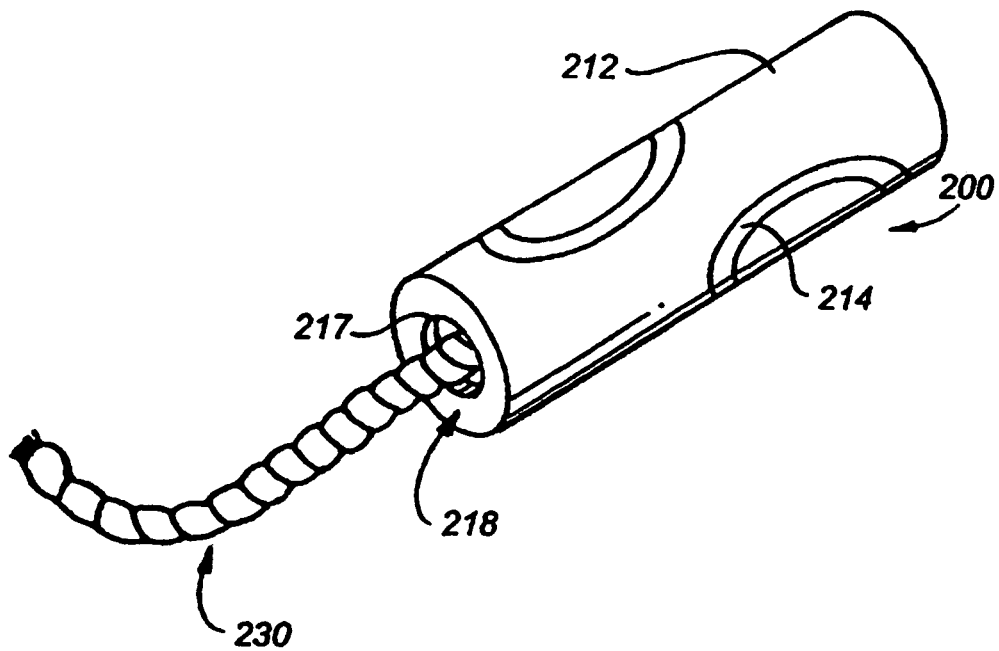
FIG. 11 is a perspective view illustrating the training toy of FIG. 10 fully assembled.

FIGS. 10 to 12 illustrate another embodiment of the toy of the invention generally indicated by reference character 200 and including a hollow cylindrical core 211 fabricated from pliable elastic rubber, from another elastomer, or from any other desired material. Pieces 212, 213 of felt or another desired material can, if desired, be adhesively secured or otherwise affixed to the outer cylindrical surface 228 of core 211. Fabric pieces 212, 213 are shaped and dimensioned and applied to surface 228 such that a space or groove of substantially constant width between the pieces 212, 213 is formed. This groove is filled with an elastic rubber material to form strip 214. Alternately, one or more fabric pieces can be utilized to completely cover surface 228, after which a strip 214 of material can be attached on or in the fabric to form a strip 214 dividing the fabric into sections on either side of the strip 214. Strip 214 presently has a width in the range of one-sixteenth to seven-sixteenths of an inch, preferably two-sixteenths to five-sixteenths of an inch. The width of strip 214 can vary as desired.

Cylindrical end piece 218 includes member 219 made from rubber or another elastomer or other desired material and includes a fabric piece 220 adhesively secured or otherwise secured to piece 219. Piece 218 includes inner circular surface 206. Cylindrical aperture 217 is formed through piece 218. Piece 218 is secured to the end 205 of core 11 and/or to the end 222 of fabric pieces 212, 213. Instead of utilizing piece 218, each half 300 of core 211 can include a semi-circular end 238 comparable to end 237 FIG. 12), except that a semi-circular opening 239 is be formed through end 238 so that when the upper and lower halves of core 211 are glued together to form core 211, an opening comparable to opening 217 is formed through ends 238.

Rope 230 includes distal end 234, proximate end 235, and an intermediate portion 236 extending between the distal and proximate ends 234, 235. An anchor 231 is formed at distal end 234. The anchor 231 can be formed by tying end 234 into the knot 231 shown, by tying end 234 around a rod, by affixing a glass ball to end 234, etc. Any method or apparatus can be utilized to form an anchor at distal end 234 as long as the anchor is shaped and dimensioned such that it can not fit or be pulled through aperture 217.

FIG. 11 illustrates toy 200 fully assembled.

FIG. 12 illustrates the lower semi-cylindrical half 300 of core 211, which includes edge surface 204 and edge surface 233. The upper half of core 211 presently has a shape and dimension equivalent to the lower half of core 211. When the two semi-cylindrical halves of core 211 are glued together along their edge surfaces 204, the hollow cylindrical core 211 illustrated in FIG. 10 results. When the two semi-cylindrical halves of core 11 are glued together along edges 233, circular diaphragm 232 (FIG. 10) results.

Diaphragm 232 divides the inner area of toy 200 into two compartments 229 and 229A. Compartment 229A is fully sealed and enclosed by diaphragm 232 and a portion of core 211. Compartment 229 is not sealed because of aperture 217, however, compartment 229 is circumscribed and enclosed by another portion of core 211.

Toy 200 can be manufactured in any desired manner, however, it is presently preferred that knot 231 (or some other anchor) be positioned in compartment 229 when the upper and lower halves of core 211 are glued together along edges 204, 233 (or are otherwise affixed to one another) to form hollow cylindrical core 211. After core 211 is formed to produce sealed compartments 229 and 229A, compartment 229A is filled with air or some other desired gas or liquid and compartment 229 is filled with air and anchor 231. The intermediate portion 236 of rope 230 extends from anchor 231, out through aperture 217, and to proximate end 235. Felt or fabric layers 212, 213 are then applied and secured to outer surface 228 in the manner earlier described. Or, if desired, a felt layer 212, 213 need not be applied to core 211.

When layers 212, 213 are applied to core 211, the portion of rope 230 extending outwardly from aperture 217 is usually temporarily folded into a compact configuration and secured in that configuration with a rubber band, string, etc. The folding of a portion of rope 230 into a compact configuration facilitates the application of felt layers 212, 213 and facilitates transport of core 211 through the remainder of the manufacturing process.

In use of the toy 200 depicted in FIG. 11, the portion of rope 230 extending outwardly from aperture 217 is manually grasped and used to throw the toy away from the user so a dog or other animal can retrieve the toy 200 and bring toy 200 back to the user. Toy 200 can also be utilized as a toy for young or adult human beings. Toy 200 need not be thrown but can be given to a dog to play with, can be used by letting a dog grasp the felt covered body of the toy in its mouth to pull on the body while the train pulls on rope 230, etc.

A manufacturing process for toy 200 is set forth in FIG. 13 and includes the step 250 of molding the top half and bottom half of the toy with a diaphragm formed intermediate the ends of each half so that the diaphragm 232 divides the inner hollow area into two compartments, one compartment 229A to be sealed when the top and bottom 300 semi-cylindrical halves are joined, and the other compartment 229 not to be sealed when the bottom halves are joined.

In step 251, an anchor is formed at the distal end 234 of rope 230. This is followed by step 252 in which the proximate end 235 is extended through opening 217 (or 239) so that anchor 231 is positioned in the unsealed compartment 229 of toy 200. In step 253, glue is applied along the seam edges 204, 233 of each half, the halves are pressed together along the seam edges to form core 211 having a seam line defined by edges 204 and, to form sealed compartment 229A and unsealed compartment 229 containing anchor 231. The member is then, in step 254, placed in a mold to heat and cure the adhesive that extends along seam edges 204, 233. Felt, another fabric, or another material can then, if desired be applied to outer surface 228 of core 211.

In FIG. 10, one end of rope 230 is in compartment 229. If desired, a pair of apertures 242, 243 can be formed through piece 218 and/or in the cylindrical wall circumscribing compartment 229. The apertures are sized are positioned to permit an end of rope 230 to be threaded through aperture 243 into compartment 229, through compartment 229, and through aperture 242 to a location outside of compartment 229 and surface 228. In this fashion, rope 230 extends completely through compartment 229 and both ends of rope 230 are located outside compartment 229. Knots or other anchor means can be formed in the ends of the rope such that the ends of the rope can not be pulled through apertures 242, 243 into compartment 229. As used herein, the term rope refers to a length of pliable material. The pliable material can be woven, extruded (like pliable plastic line), or otherwise formed. Conventional woven cotton or nylon rope is, however, presently preferred in the practice of the invention. Rope 230 can have a conventional cylindrical shape like that shown in the drawings, can be substantially flat (if a leather strap is used), or can take on any desired shape and dimension.

Compartment 229 is, as noted, presently preferably filled with air. Sand, rubber, foam, or any other desired material can completely or partially fill compartment 229. Compartment 229 is presently preferably not sealed. If desired, compartment 229 can be sealed and filled with any desired solid, liquid, gas or combination thereof. Compartment 229 can be filled with any desired solid, liquid, gas or combination thereof.

As used herein, the term fabric includes material made by weaving, felting, knitting, knotting, bonding, or crocheting natural or synthetic fibers and/or filaments. Examples of natural fibers are, without limitation, cotton, wool, and silver. Examples of synthetic fibers are, without limitation, nylon, rayon and Kevlar™. Felts are, are earlier noted, presently preferred in the practice of the invention.

Figure 14:
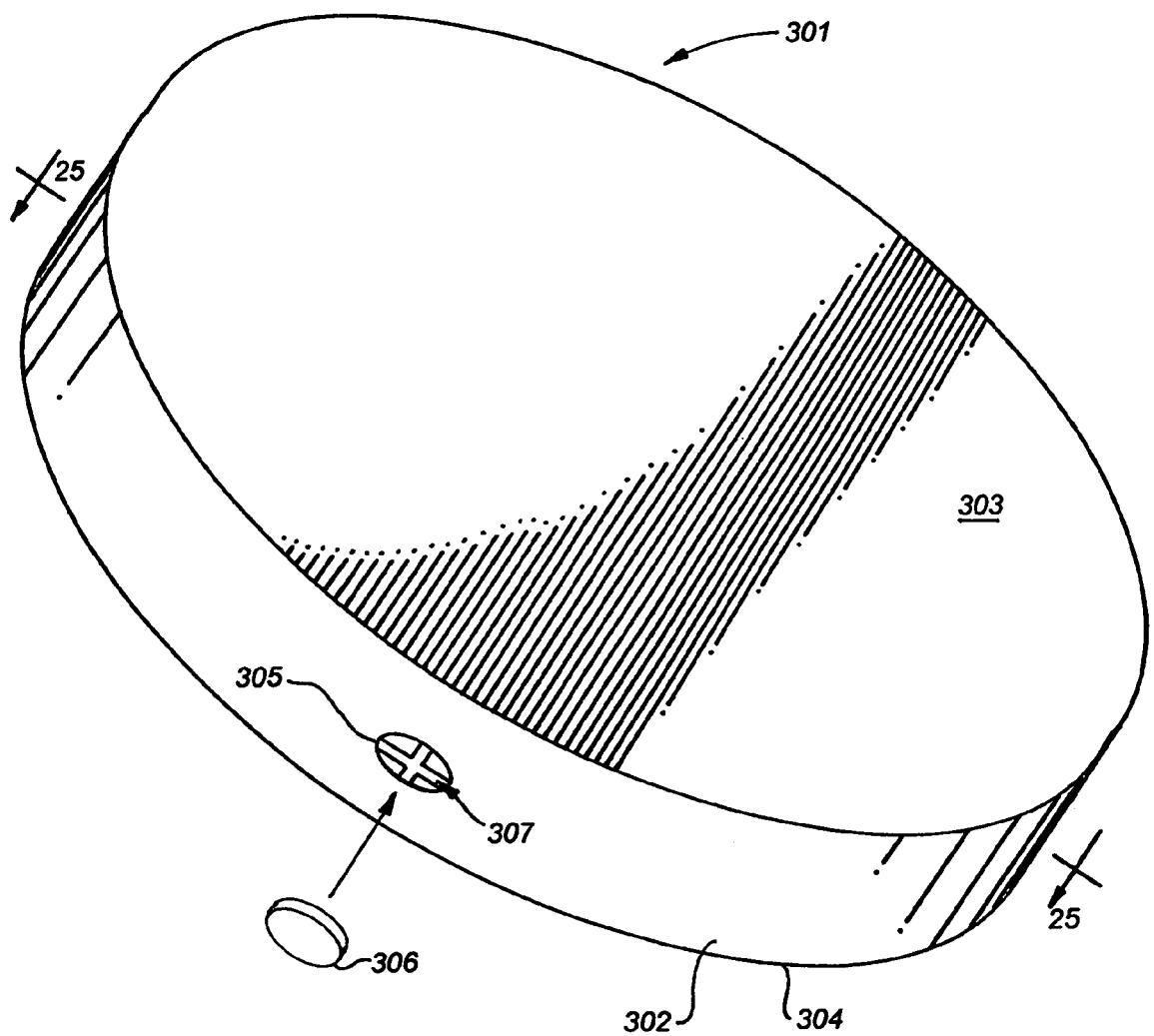
FIG. 14 is a perspective view illustrating an alternate embodiment of the invention.

Another embodiment of the invention is illustrated FIG. 14 and is generally indicated by reference character 301. Cylindrical toy 301 comprises a compressibly elastically deformable hollow thin walled elastomer core 310 (FIG. 25) that circumscribes and encloses a selected compressible gaseous volume 330. Gaseous volume 330 typically comprises air. Toy 301 includes center 321 that is equidistant from the circular top (not visible) and circular bottom 311 of toy 301. The circular top is equivalent in size to bottom 311 and is parallel to and spaced apart from bottom 311. Cylindrical outer wall 312 extends between and interconnects the circular top and bottom 311. Points on the outer and inner surfaces of wall 312 are at varying distances from center 321. Wall 312, the circular top, and circular bottom 311 can have any desired thickness but preferably each are less than about eight millimeters thick.

A fabric cover is affixed to the outer surface of core 310 and has a selected thickness. The ratio of the thickness of the fabric cover to the thickness of the wall 312 is in the range of 1:6 to 1:0.15. The ratio of the thickness of the fabric cover to the thickness of the circular top or circular bottom 311 is in the range of 1:6 to 1:0.15. At least one elongate strip of material can, if desired, extend over the outer surface of the core as a line of demarcation to separate the fabric cover into at least two areas, one on either side of the strip of material. This line of demarcation is not shown in FIG. 14 but could, by way of example and not limitation, be comparable to the line of demarcation 14 illustrated in FIG. 1.

At least one aperture 308 (FIGS. 24 and 25) is formed in core 310. An aperture 305 can also, if desired, be formed through the fabric cover. The fabric cover includes a circular portion 303 covering the circular top of core 310, includes a circular portion 304 covering the bottom 311 of the core 310, and includes a cylindrical portion or wall 302 covering the cylindrical wall 312 of core 310. Wall 302 extends between and interconnects portions 303 and 304. A hollow sound device 307 is inserted in aperture 308. Device 307 produces a sound audible to an animal. As used herein, a sound audible to an animal is defined as a sound in the range of frequencies that is audible to a dog because a sound in this range of frequencies can in most cases be heard by human beings and many other animals. The sound device 307 illustrated in FIG. 16 is presently preferred in the practice of the invention, but the sound device 330 illustrated in FIG. 15 can be utilized, as can be any other desired sound device.

Sound device 307 includes hollow cylindrical leg 338 and upstanding lip or rim 337 that is connected to and extends outwardly from leg 338. Apertures 331 and 332 are formed in the top of and extend downwardly into leg 338. As is illustrated in FIG. 17, a semi-circular, hollow, tapered toe 341 is provided with a reed or a thin piece of plastic 342 that extends downwardly over and slightly spaced apart from the opening in toe 341. When air travels upwardly into toe 341 in the direction of arrow 335, the air also passes by reed 342 and causes reed 342 to vibrate. Reed 342 or the movement of reed 342 in conjunction with the proximity of toe 341 produces sound, typically a sound with a high pitch. The construction of a wide variety of sound devices is well known in the art, as are a variety of sounds that such devices can produce and that have a high, low, or intermediate pitch. Any desired sound device can be utilized in the practice of the invention. Device 307 produces sound only when air flows through device 307 at a selected rate of flow. If the rate of flow of air through device 307 is too slow, device 307 will not produce sound. It is desirable in the practice of the invention that device 307 produce sound when the top and bottom 311 of toy 301 are compressed rapidly by a dog holding toy 301 in its mouth. The rate of flow of air through device 307 required to cause device 307 to produce sound can be varied as desired. Air flowing upwardly in the direction of arrow 335 in FIG. 17 flows past reed 342, into toe 341 in the manner indicated by arrow 340, and out through the apertures 331, 332 formed in the top of device 307. Air flowing out through apertures 331, 332 travels in the directions indicated by arrows 333 and 334.

The hollow sound device 330 illustrated in FIG. 15 operates in the same manner as device 307. Air passing upwardly into device 330 travels over a reed (not shown) and into a toe (not shown) and out through aperture 352 in the direction of arrow 351. Device 330 includes conical leg 353 having a top including circular edge 354. Conical leg 353 is sized such that it can be forced downwardly through an aperture 308 to distend the elastic material around aperture 308 to permit leg 353 to be pushed through aperture 308 and into the interior of a toy 301. The diameter of edge 354 is, however, significantly greater than the diameter of opening 308 such that once leg 353 is forced through aperture 308 into the interior of toy 301, leg 353 can not be readily pulled back out through aperture 308.

Figure 18:
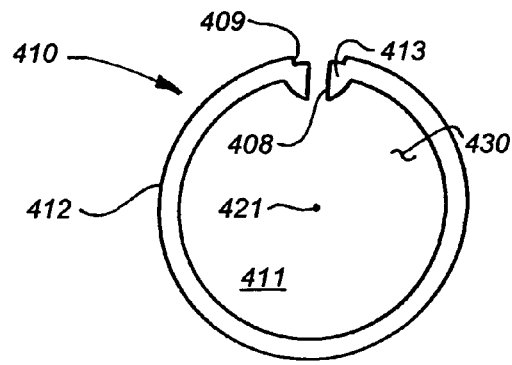
FIG. 18 is a section view illustrating a method for producing an animal toy comparable to that illustrated in FIG. 14.

One method for making a toy 301 is illustrated in FIGS. 18 to 21. In FIG. 18 a compressibly elastically deformable hollow thin-walled elastomer core 410 is provided. The core 410 circumscribes a compressible gaseous volume 430, which volume typically is air. The core includes a center 421. Center 421 is equidistant from the circular top (not visible) and circular bottom 411 of core 410. The circular top is equivalent in size to bottom 411 and is parallel to and spaced apart from bottom 411. Cylindrical outer wall 412 extends between and interconnects the circular top and circular bottom 411. Points on the outer and inner surfaces of wall 412 are at varying distances from center 421. Wall 412, the circular top, and the circular bottom 411 can have any desired thickness but preferably are less than about eight millimeters thick. At least one aperture 408 is formed in core 410.

Figure 19:
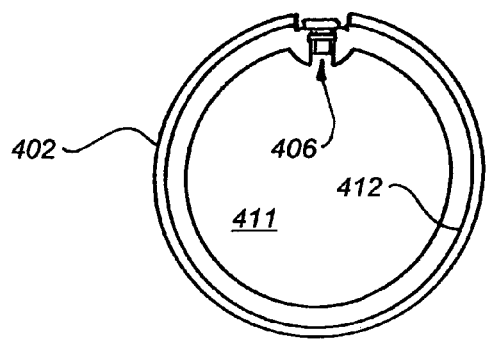
FIG. 19 is a section view further illustrating the method of FIG. 18 for producing an animal toy.
Figure 20:
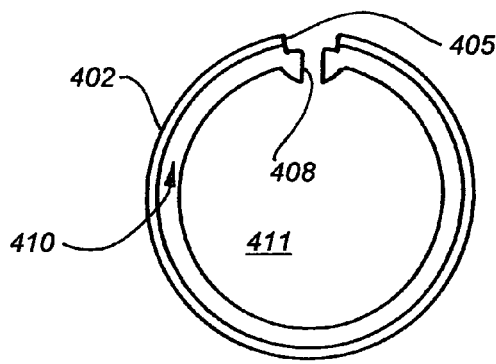
FIG. 20 is a section view further illustrating the method of FIG. 18 for producing an animal toy.

As is illustrated in FIG. 19, a removable plug 406 is fixedly inserted in aperture 408. Insertion of the plug is important in the practice of the method of the invention because when a fabric cover is affixed to the outer surface of core 410, pressure and heat are used. If the plug 406 is not utilized and is not permitted to function to maintain air inside core 410 when the pressure is applied, the core 410 can collapse, ruining the attempt to apply the fabric cover.

After the plug 406 is inserted, a fabric cover is affixed to the outer surface of core 410 using pressure and a material that causes the fabric cover to adhere to the core 410. The fabric cover has a selected thickness. The ratio of the thickness of the fabric cover to the thickness of the wall 412 is in the range of 1:6 to 1:0.15. The ratio of the thickness of the fabric cover to the thickness of the circular top or circular bottom 311 is in the range of 1:6 to 1:0.15. At least one elongate strip of material can, if desired, also be applied to and extend over the outer surface of the core as a line of demarcation to separate the fabric cover into at least two areas, one on either side of the strip of material. This line of demarcation is not shown in FIG. 14 but could, by way of example and not limitation, be comparable to the line of demarcation 14 illustrated in FIG. 1. Methods for applying the fabric cover and lines of demarcation are described earlier herein. Any desired method can be utilized to apply the fabric cover and lines of demarcation. The material comprising the fabric cover can vary as desired, but presently preferred materials are also described earlier herein. An aperture 405 can also, if desired, be formed through the fabric cover. The fabric cover includes an upper circular portion (not shown) covering the outer surface of the circular top of core 410, includes a lower circular portion (not shown) covering the outer surface of the bottom 411 of the core 410, and includes a cylindrical portion or wall 402 extending around and covering the cylindrical wall 412 of core 410. Wall 402 interconnects the upper and lower circular portions of the fabric cover.

Figure 21:
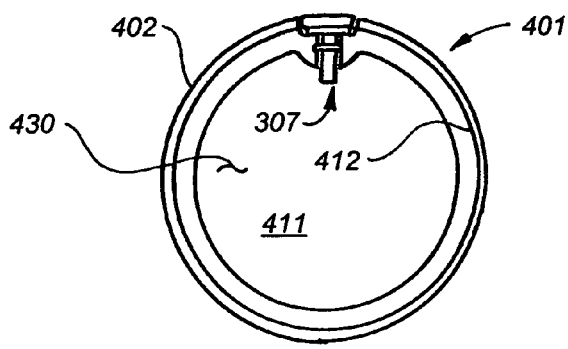
FIG. 21 is a section view further illustrating the method of FIG. 18 for producing an animal toy.

After the fabric cover is applied, plug 406 is removed and sound device 307 is inserted in aperture 408 in the manner shown in FIG. 21. Rib 337 of device 307 compresses and indents a portion of the cylindrical side of aperture 408 and functions to anchor device 307 in aperture 408. A shown in FIG. 14, it is preferred that a cylindrical piece of fabric material or "plug" 306 is used to cover the top of sound device 307 such that animal toy 307 appears to be completely covered by fabric material. Piece 306 can also comprise a flap that is partially attached to and folded back onto the fabric cover such that piece 306 can be fold off the fabric cover onto the top of device 307. Piece 306 or some other way of concealing the top of device 307 is important because a dog can attempt to remove the sound device 307 from core 410. If the location of the sound device 307 is covered or disguised, it makes it more difficult for a dog to find and remove or damage device 307.

It is preferred that core 410 include an area 413 that is thicker than the top, bottom 411, or wall 412 of core 410. The increased volume or size of area 413 functions to protect sound device 307 and make it more difficult for an animal to remove device 307 from core 410.

Figure 22:
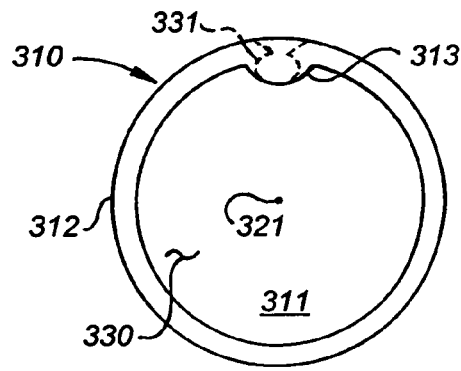
FIG. 22 is a section view illustrating another method for producing the animal toy of FIG. 14.

Another method for making a toy 301 is illustrated in FIGS. 22 to 25. In FIG. 22 a compressibly elastically deformable hollow thin-walled elastomer core 310 is provided. The core 310 completely sealingly circumscribes a compressible gaseous volume 330, which volume typically is air. The core includes a center 321. Center 321 is equidistant from and generally centered with respect to the circular top (not visible) and circular bottom 311 of core 310. The circular top is equivalent in size to bottom 311 and is parallel to and spaced apart from bottom 311. Cylindrical outer wall 312 extends between and interconnects the circular top and circular bottom 311. Points on the outer and inner surfaces of wall 312 are at varying distances from center 321. Wall 312, the circular top, and circular bottom 311 (or wall 412, wall 512, bottom 411, bottom 511, etc.) can have any desired thickness including any of the wall thicknesses previously discussed herein for other embodiments of the invention, but presently preferably are less than about eight millimeters thick. Core 310 includes a portion 313 that is formed in wall 312 and that has greater thickness and mass than the remainder of wall 312. Portion 313 functions, as will be seen, to provide support for a sound device 307 that is subsequently inserted in core 310. Another important function of portion 313 is to made core asymmetric. Such asymmetry promotes the erratic bouncing of toy 301 because a portion of the weight of the toy is not equally distributed about the wall 312. Since toy 301 can take on any desired shape and dimension, the asymmetry caused by portion 313 is important because it causes erratic bouncing of toy 301 even when toy 301 is spherical. If desired, portion 313 can be omitted, i.e., wall 312 can have a constant thickness throughout. Omitting portion 313 reduces the likelihood that toy 301 will bounce erratically, particularly if toy 301 is spherical. In addition, even if portion 313 is not utilized and wall 312 has the same thickness at all points, simply forming hole 308 in wall 312 and inserting device 307 tends to make toy 301 asymmetric because the device 307 ordinarily does not have the same mass as the material in wall 312. An aperture 308 can, if desired, be formed in the top or bottom 311 of core 310 or at any desired location in core 310. Since, as noted, one function of portion 313 is to promote asymmetry due to the increased weight or mass that portion 313 adds to a portion of core 310. As would be appreciated by those of skill in the art, portion 313 can be located at any desired location on or in core 310. The shape and dimension of portion 313 can vary as desired. Two or more portions 313, each having the same or different shape and dimension, can be formed on or in core 310. A portion 313 can, if desired, not be attached to the wall of core 310 in the manner of portion 313, but can be inside core 310 and be free to move around therein. The thickness of the wall of core 310 can be varied as desired to promote either an erratic bounce or a uniform bounce of a toy 301 along a straight line.

Figure 23:
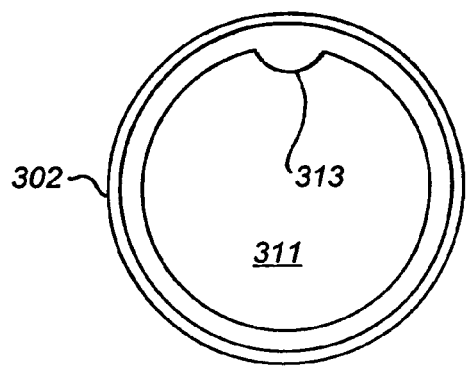
FIG. 23 is a section view further illustrating the method of FIG. 22 for producing an animal toy.

A fabric cover is affixed to the outer surface of core 310 using pressure and a material that causes the fabric cover to adhere to the core 310. Core 310 can, because core 310 completely sealingly circumscribes the gaseous volume 330, withstand the pressure that ordinarily must be applied in order to affix the fabric cover to the core 310. Consequently, core 310 does not collapse when the pressure is applied. FIG. 23 illustrates the fabric cover applied to core 310. The fabric cover has a selected thickness. The ratio of the thickness of the fabric cover to the thickness of the wall 312 is in the range of 1:6 to 1:0.15. The ratio of the thickness of the fabric cover to the thickness of the circular top or circular bottom 311 is in the range of 1:6 to 1:0.15. At least one elongate strip of material can, if desired, also be applied to and extend over the outer surface of the core as a line of demarcation to separate the fabric cover into at least two areas, one on either side of the strip of material. This line of demarcation is not shown in FIG. 14 but could, by way of example and not limitation, be comparable to the line of demarcation 14 illustrated in FIG. 1. Methods for applying the fabric cover and lines of demarcation are described earlier herein. Any desired method can be utilized to apply the fabric cover and lines of demarcation. The material comprising the fabric cover can vary as desired, but presently preferred materials are also described earlier herein. The fabric cover includes an upper circular portion 303 (FIG. 14) covering the outer surface of the circular top of core 310, includes a lower circular portion 304 (FIG. 14) covering the outer surface of the circular bottom 311 of the core 310, and includes a cylindrical portion or wall 302 extending around and covering the cylindrical wall 312 of core 310. Wall 302 interconnects the upper 303 and lower 304 circular portions of the fabric cover.

Figure 24:
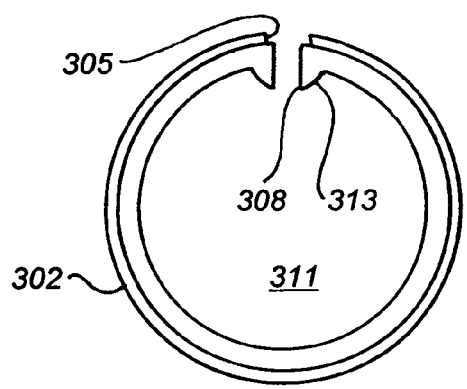
FIG. 24 is a section view further illustrating the method of FIG. 22 for producing an animal toy.

After the fabric cover is applied, an aperture 308 is drilled or otherwise formed in core 310. Aperture 308 includes a countersunk portion that receives the top or head 400 of device 307 so that the top 400 of device 307 is flush with or inset with respect to the outer surface of core 310. An aperture 305 is also formed through the fabric cover. The aperture 308 can be formed at this point in the process because fabric cover 302 has been applied, and the air inside core 310 is no longer required to function to prevent the collapse of core 310 when pressure is applied to the outside of core 310. FIG. 24 illustrates core 310 and the fabric cover after apertures 308 and 305 are formed.

Figure 25:
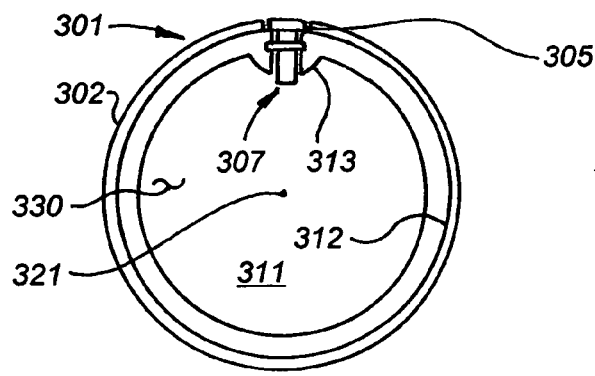
FIG. 25 is a section view further illustrating the method of FIG. 22 for producing an animal toy.

Sound device 307 is inserted in aperture 308 in the manner shown in FIG. 25. Rib 337 of device 307 compresses and indents a portion of the cylindrical side of aperture 308 and functions to anchor device 307 in aperture 308. Any desired method or apparatus can be utilized to fix device 307 in aperture 308 or in core 310. As shown in FIG. 14, it is preferred that a cylindrical piece of fabric material or "plug" is used to cover the top of sound device 307 such that animal toy 301 appears to be completely covered by fabric material. This is important because a dog or other animal can attempt to remove the sound device 307 from core 310. If the location of the sound device 307 is covered or disguised, it makes it more difficult to a dog to find and remove or damage device 307.

In use of the toy 301 (or 401 or 501), the toy is given to a dog or other animal, or is thrown so that the dog has to retrieve the toy. When the dog compresses the toy 301 in its mouth, it compresses air in compressible volume 330, forcing air outwardly through device 307 in the manner indicated by arrows 335, 340, 333, and 334 in FIGS. 16 and 17. This causes device 307 to produce a sound that the dog hears. When the dog releases the compressive pressure on toy 301, the toy elastically returns to the normal configuration illustrated in FIG. 14. When the toy elastically returns to the normal configuration illustrated in FIG. 14, air is drawn through device 307 back into volume 330 in directions opposite the directions indicated by arrows 333, 334, 340, and 335. When air is drawn back into volume 330, device 307 also produces sound that the dog can hear. If desired, however, device 307 need only produce sound when air travels through device 307 in one direction—either when air is expelled from volume 330 through device 307 or when is air drawn through device 307 into volume 330. One particular advantage of toy 301 is that device 307 makes the toy safer to use. When it is dusk or dark and it is difficult for an animal to see the toy, sound made by the toy helps the animal locate the toy. Similarly, when the animal is in high grass and has difficulty seeing toy 301, any sound made by the toy 301 helps the animal locate the toy. Since toy 301 is compressible, the toy will typically, although not necessarily, generate noise when the toy strikes the ground or an object and is compressed. When the toy is compressed, air is forced outwardly through device 307, producing sound audible to the animal.

Figure 26:
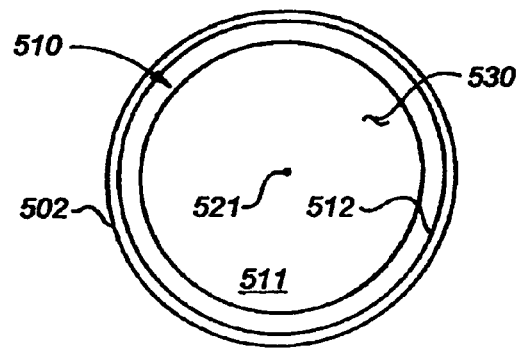
FIG. 26 is a section view illustrating still another method for producing an animal toy comparably to the toy of FIG. 14.
Figure 27:
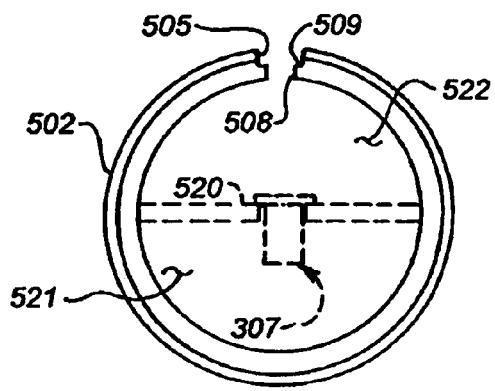
FIG. 27 is a section view further illustrating the method of FIG. 26 for producing an animal toy.
Figure 28:
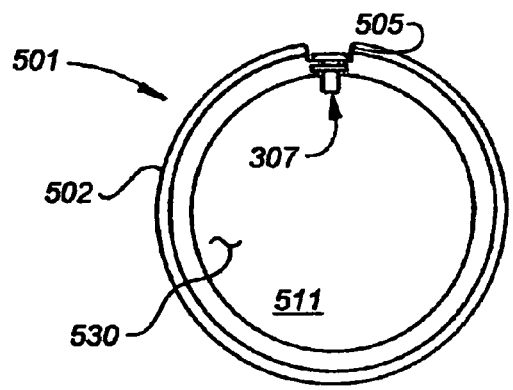
FIG. 28 is a section view further illustrating the method of FIG. 26 for producing an animal toy.

Still another method for making a toy 301 is illustrated in FIGS. 26 to 28. In FIG. 26 a compressibly elastically deformable hollow thin-walled elastomer core 510 is provided with a fabric cover affixed to the outer surface of core 510. The core 510 completely sealingly circumscribes a compressible gaseous volume 530, which volume typically is air, but which can consist of any other gas or gasses or fluid or fluids. The core includes a center 521. Center 521 is equidistant from the circular top (not visible) and circular bottom 511 of core 510. The circular top is equivalent in size to bottom 511 and is parallel to and spaced apart from bottom 511. Cylindrical wall 512 extends between and interconnects the circular top and circular bottom 511. Points on the outer and inner surfaces of wall 512 are at varying distances from center 521. Wall 512, the circular top, and the circular bottom 511 can have any desired thickness, but preferably are less than about eight millimeters thick. Toy 501 can take on any desired shape and dimension.

The ratio of the thickness of the fabric cover to the thickness of the wall 512 is in the range of 1:6 to 1:0.15. The ratio of the thickness of the fabric cover to the thickness of the circular top or circular bottom 511 is in the range of 1:6 to 1:0.15. At least one elongate strip of material can, if desired, also be applied to and extend over the outer surface of the core as a line of demarcation to separate the fabric cover into at least two areas, one on either side of the strip of material. This line of demarcation is not shown in FIG. 14 but could, by way of example and not limitation, be comparable to the line of demarcation 14 illustrated in FIG. 1. The material comprising the fabric cover can vary as desired, but presently preferred materials are also described earlier herein. The fabric cover includes an upper circular portion (not shown) covering the outer surface of the circular top of core 510, includes a lower circular portion (not shown) covering the outer surface of the bottom 511 of the core 510, and includes a cylindrical portion or wall 502 extending around and covering the cylindrical wall 512 of core 510. Wall 502 interconnects the upper and lower circular portions of the fabric cover.

An aperture 508 is drilled or otherwise formed in core 510. An aperture 505 is also formed through the fabric cover. Apertures 505 and 508 are illustrated in FIG. 27. The aperture 508 can be formed at this point in the process because fabric wall 502 has been applied, and the air inside core 510 is no longer required to function to prevent the collapse of core 510 when pressure is applied to the outside of core 510.

Sound device 307 is inserted in aperture 508 in the manner shown in FIG. 28. Rib 337 of device 307 compresses and indents a portion of the cylindrical side of aperture 508 and functions to anchor device 307 in aperture 508. Any desired method or apparatus can be utilized to fix device 307 in aperture 508 or in core 510. As shown in FIG. 14, it is preferred that a cylindrical piece of fabric material or "plug" is used to cover the top of sound device 307 such that animal toy 501 appears to be completely covered by fabric material. This is important because a dog or other animal can attempt to remove the sound device 307 from core 510. If the location of the sound device 307 is covered or disguised, it makes it more difficult to a dog to find and remove or damage device 307.

Still another embodiment of the toy includes a rib that is formed inside of core 510 and that is indicated in FIG. 27 by dashed lines 520. Sound device 307 is mounted in rib 520 such that compressing toy 501 causing air to move through device 307 from one side of rib 520 to the other side of rib 520 such that device 307 produces a sound that can be heard by a dog or other animal. While it is possible that this embodiment of the invention will function to produce sound even if an aperture 508 is not formed through core 510, it is preferred that an aperture 508 be formed in core 510 to facilitate the ready travel of air through device 307. Installing device 307 in rib 520 makes it much more difficult for a dog to damage device 307. The dog would have to tear open core 510 to access device 307. Rib 520 and device 307 preferably completely divide the inner volume 530 into two separate compartments.

In still another embodiment of the invention, the process set forth in FIGS. 18 to 21 is utilized, except that in FIG. 19 device 307 is installed instead of plug 406, and a plug is installed directly in device 307 to prevent air from escaping from volume 430 while the fabric cover is applied. After the fabric cover is applied, the plug blocking device 307 is removed to permit air to flow through device 307 when the toy 401 is compressed.

The soft fabric cover described herein on the toys of the invention is, as noted, important because it reduces the risk of injury to an animal. The processes set forth in FIGS. 18 to 25 are central to the invention because they enable application of the fabric cover to be achieved under pressure and still allow a sound device to be installed and concealed in a toy.

Another embodiment of the invention comprises molding or otherwise forming an opening 331 (FIG. 22) in the core 310 when core 310, or a portion of core 310, is being produced. The opening 331 is shaped and dimensioned such that when air travels through the opening 331 (either traveling from the inside of core 310 out through opening 331 or vice-versa) at a selected flow rate audible sound is produced that can be heard by a dog or other animal. The advantage of forming opening 331 during the molding of core 310 is that the resulting animal toy 301 does not require the drilling or other formation of an aperture 308 in core 310 and does not require the subsequent insertion of a separate sound device 307 in aperture 308. Sound device 307 and aperture 308 are not required because the opening 331 functions to produce sound when air passes therethrough. In a similar manner, the aperture 508 formed in core 510 in FIG. 27 can be shaped and dimensioned to produce sound when air travels into or out of core 510 at a desired flow rate. When aperture 508 is so formed, it is not necessary to insert device 307 in aperture 508 to produce sound. Aperture 331 and aperture 508 (when aperture 508 is formed to produce sound when air passes therethrough) demonstrate embodiments of the invention in which separate sound devices 307 need not be inserted in a toy 301, 501.

One or more bulkheads can be formed inside a core 310, 410, 510 of a toy 301, 401, 501. The bulkheads can extend partially or completely across the volume inside the core. A bulkhead can include an aperture formed therein to produce noise when air passes therethrough, and can include a sound device 307 inserted in the bulkhead to produce noise when air passes through the sound device 307.

The outer surface of a sound device 307 can—in addition to or in place of a rib 337 that alters the shape of an opening 308, 408, 508—be made of a material that frictionally engages the material comprising the wall of the opening 308, 408, 508 that contacts the outer surface of device 307. This makes it more difficult for an animal to remove device 307 from an opening 308, 408, 508. In this respect, soft polymers tend to adhere frictionally to one another more effectively that hard smooth polymers. Or, a soft polymer with a high coefficient of friction can function to adhere to the surface of a hard smooth polymer or other material.

Figure 29:
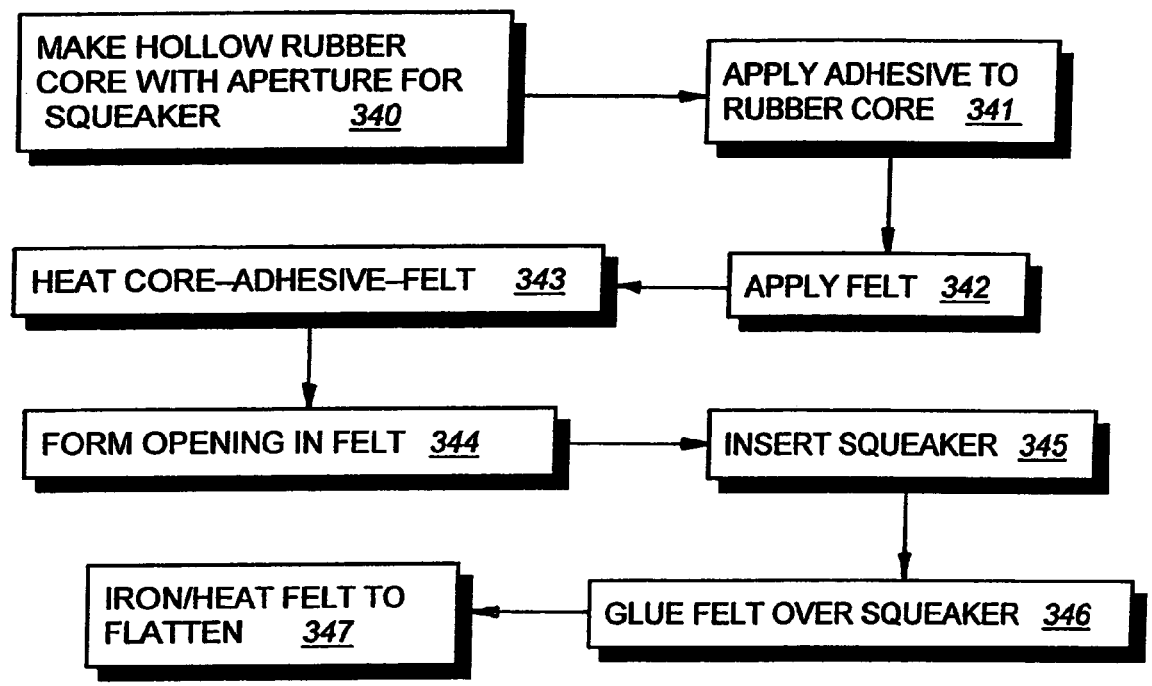
FIG. 29 illustrates an alternate method for producing an animal toy in accordance with the principles of the invention.

Another method for making a toy of the general type illustrated in FIGS. 18 to 28 is illustrated in FIG. 29. In step 340, a compressibly elastically deformable spherical hollow thin-walled rubber (or other elastomer) core is provided. The core includes an aperture shaped and dimensioned to receive a squeaker. The aperture can be formed in any desired manner, including by drilling or by being formed when the core (or a part of the core) is formed in a mold. The shape and dimension of the core can vary as desired and need not be spherical. While not necessary, the aperture preferably includes an inset or countersunk portion similar to the inset portion 509 illustrated in FIG. 27. The cap or top 400 of the squeaker 307 seats in such inset portion so that the top 400 of the squeaker 307 is flush with the outer surface of the core.

In step 341, adhesive is applied to the exterior of the rubber core, after which a layer of felt is applied in step 342. The core-adhesive-felt combination is heated in step 343, after which an opening is formed in the felt in step 344. The opening is in registration with the aperture formed in the core.

The opening is made by cutting through the felt and removing felt from about the aperture. A squeaker 307 is inserted in the opening in the core in step 345. In step 346, a piece of felt is glued over the top 400 of the squeaker 307 to disguise the location of the squeaker. A iron or other instrument is used in step 347 to flatten and smooth the piece of felt.

The ability to produce an animal toy according to the method set forth in FIG. 29 was a surprising result because it had been suggested that attempting to apply felt to a rubber core when there was an aperture in the core would cause the core to collapse. When the core has a wall thickness in the range set forth earlier herein, the core appears to retain its shape and not to collapse when felt is applied and the core and felt (and adhesive) are compressed and heated in a mold. If undue compressive pressure is applied to the core-adhesive-felt, the core likely will collapse. Only minimal experimentation is normally required to determine a reasonable compressive pressure that will not cause the core-adhesive-felt to collapse when heated to about 135 degrees C. to 145 degrees C. for five minutes. It may be possible to apply no or only minimal compressive force to the felt and core when the mold contacts the felt because heat alone will cure or otherwise affect the adhesive such that the felt or other fabric properly adheres to the core. While the elevated temperature utilized to heat the mold—and therefore the felt and adhesive—is presently 135 degrees C. to 145 C., any desired elevated temperature in excess of the ambient room temperature of about 76 degrees F., preferably in excess of 100 degrees F., most preferably in excess of 200 degrees F. can be utilized to heat the felt and adhesive. The length of time for which the felt and adhesive and core are heated can vary as desired, but presently typically is in the range of one minute to thirty minutes, preferably one minute to twenty minutes, and most preferably one minute to ten minutes.

Figure 30:
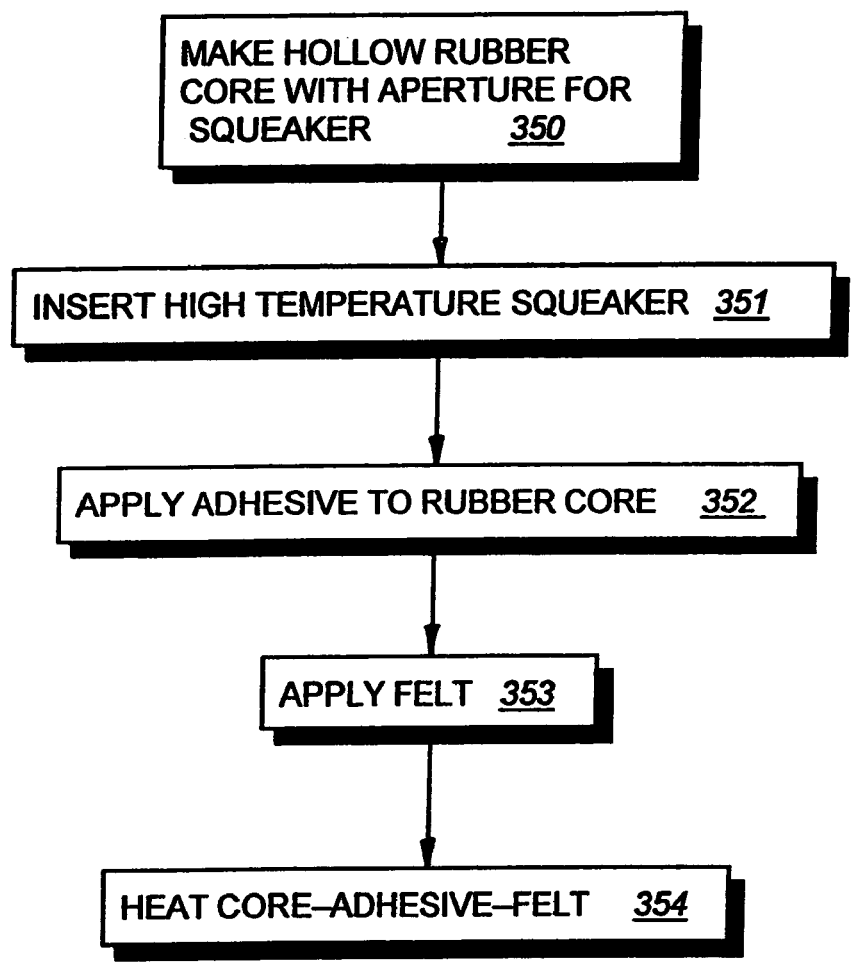
FIG. 30 illustrates a further alternate method for producing an animal toy in accordance with the invention.

A further method for producing an animal toy of the general type illustrated in FIGS. 18 to 28 is illustrated in FIG. 30. In step 350, a compressibly elastically deformable spherical hollow thin-walled rubber (or other elastomer) core is provided. The core includes an aperture shaped and dimensioned to receive a squeaker. The aperture can be formed in any desired manner, including by drilling or by being formed when the core (or a part of the core) is formed in a mold. The shape and dimension of the core can vary as desired and need not be spherical. While not necessary, the aperture preferably includes an inset or countersunk portion similar to the inset portion 509 illustrated in FIG. 27. The cap or top 400 of the squeaker seats in such inset portion so that the top 400 of the squeaker 307 is flush with the outer surface of the core and does not extend upwardly past the outer surface of the core.

In step 351, a temperature resistant squeaker is inserted in the aperture formed in the core. The squeaker is formed of a material, preferably a polymer, that will not melt or deform at the elevated temperature at which the core-adhesive-felt typically are heated to cure or otherwise affect the rubber adhesive or other adhesive used to secure the felt or other fabric to the core. Using such a temperature resistant squeaker significantly simplifies the process of producing an animal toy that includes a squeaker. As used herein with respect to the material(s) comprising a squeaker, a squeaker is temperature resistant if it functions normally after being subjected to the elevated temperature applied to the felt and adhesive to cure or otherwise affect the adhesive to secure the felt to the core. The squeaker will function normally after being subjected to an elevated temperature greater than 100 degrees F., preferably after being subjected to an elevated temperature greater than 200 degrees F., and most preferably after being subjected to an elevated temperature greater than 300 degrees F. While the shape and dimension of the temperature resistant squeaker can vary as desired, it is presently preferred that the squeaker include a reed 342 that vibrates when air passes over the reed and that is fabricated from a temperature resistant material. A temperature resistant reed squeaker apparently has not been utilized to facilitate the manufacture of a fabric covered squeaker toy for animals.

After the temperature resistant squeaker is inserted in the core, rubber adhesive or another desired adhesive or fastening material is applied to the outer surface of the rubber core in step 352. A layer of felt is applied to the layer of adhesive in step 353. In step 354, the core-adhesive-felt is compressed and heated, typically to about 300 degrees F., to cure the rubber adhesive and to compact and smooth the layer of felt to make it more difficult for an animal to tear the felt off the rubber core.

The ability to produce an animal toy according to the method set forth in FIG. 30 was a surprising result because it had been suggested that attempting to heat a squeaker would not work because the heat would melt or deform the squeaker. It was discovered that it was feasible to produce a squeaker from a polymer that would not melt at the elevated temperature used to compress and cure the adhesive that secured the felt to the core and to compress and cure the adhesive that was used to form seams between pieces of felt that were attached to the core. Using such a temperature resistant squeaker significantly reduces the time required to produce a felt covered squeaker animal toy. A particular advantage of using the temperature resistant squeaker is that the felt layer on the completed toy is substantially continuous, which makes it more difficult for an animal to locate the squeaker and remove the squeaker from the toy. When a piece of felt is removed to insert the squeaker and is then glued back in place over the squeaker, it is easier for an animal to locate the squeaker. Another feature that makes it more difficult for an animal to locate and remove the squeaker is countersinking the head of the squeaker in the manner earlier described herein. A further feature that makes it more difficult for an animal to remove the squeaker is using a squeaker 330 that has a tapered base 353. The base 353 has a diameter greater than that of the aperture formed in the core of the toy, and has a lip 354, both of which make removal of the squeaker from the core difficult. Still another feature that makes it more difficult for an animal to remove the squeaker is to utilize in the core a reinforced, stronger area 413 (FIG. 18) around the squeaker that is thicker than other areas of the wall of the core.

Figure 31:
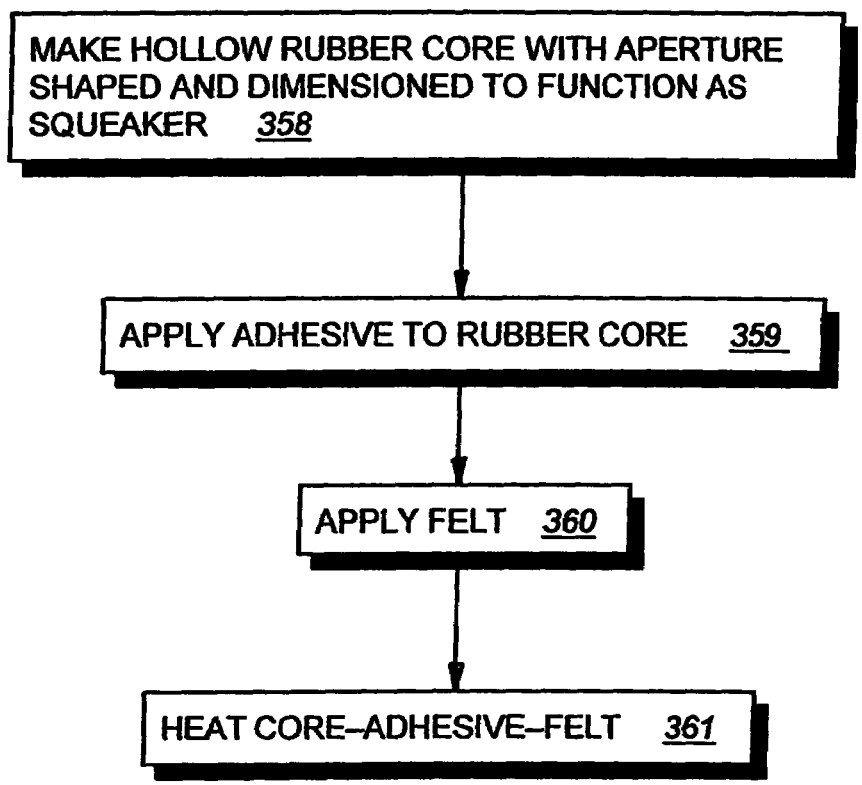
FIG. 31 illustrates another alternate method for producing an animal toy in accordance with the invention.

Another method for making a toy of the general type illustrated in FIGS. 18 to 28 is illustrated in FIG. 31. In step 358, a compressibly elastically deformable spherical hollow thin-walled rubber (or other elastomer) core is provided. The core includes an aperture shaped and dimensioned to function as a squeaker and to produce noise when air moves through the aperture. Forming the aperture in this manner obviates having to later insert a squeaker in the core. The aperture can be formed in any desired manner, including by drilling or by being formed when the core (or a part of the core) is formed in a mold. The shape and dimension of the core can vary as desired and need not be spherical.

In step 359, adhesive is applied to the exterior of the rubber core, after which a layer of felt is applied in step 359. If the felt has an adhesive backing, then step 359 can be skipped and adhesive need not be applied to the outer surface of the rubber core. The core-adhesive-felt combination is compressed, heated, and cured in step 361.

Figure 32:
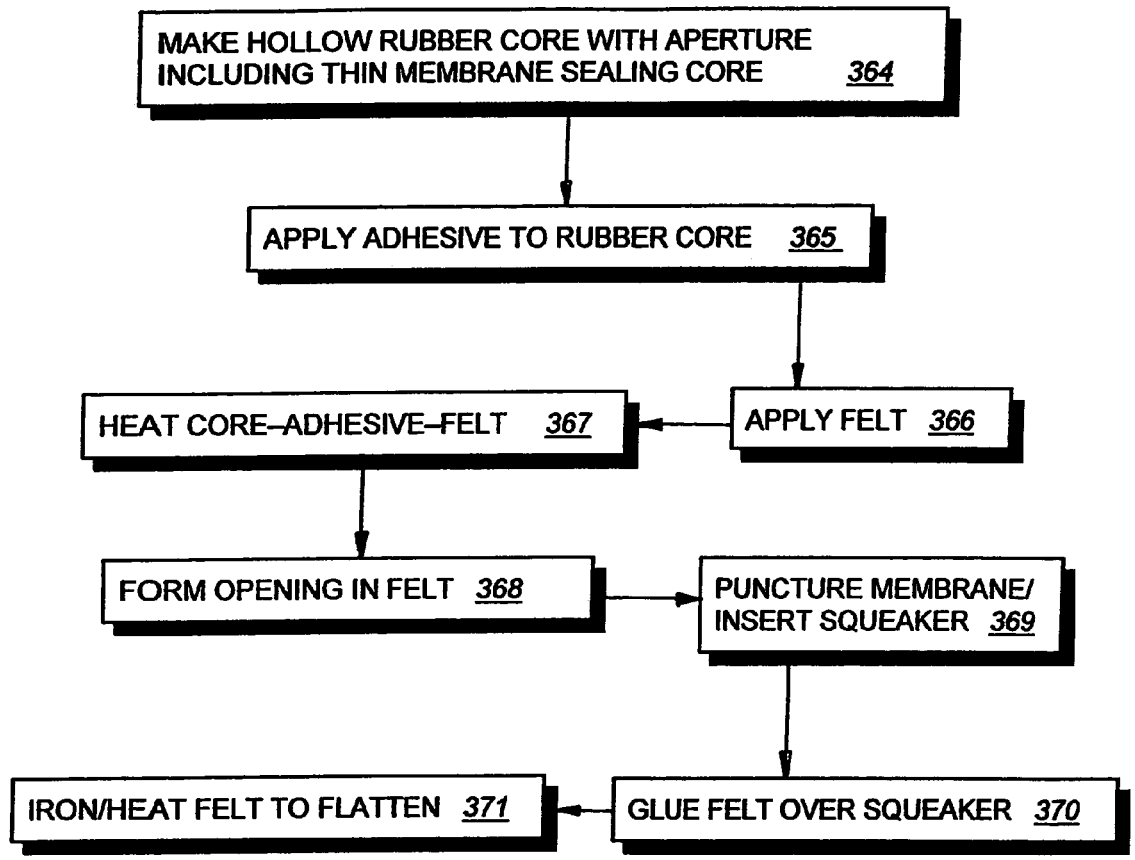
FIG. 32 illustrates still a further alternate method for producing an animal toy in accordance with the invention.

Another method for making a toy of the general type illustrated in FIGS. 18 to 28 is illustrated in FIG. 32. In step 364, a compressibly elastically deformable spherical hollow thin-walled rubber (or other elastomer) core is provided. The core includes an aperture 408 shaped and dimensioned to receive a squeaker. The aperture does not, however, extend completely through the wall of the core. Instead, a thin membrane—indicated by dashed lines 408A in FIG. 18—extends across a portion of aperture 408. Membrane 408A ensures that the interior of the core is sealingly enclosed. As described below, when a squeaker 307 is inserted in the aperture 408, the membrane 408A is punctured. The membrane can be fabricated from any material including a polymer, paper, etc.

The aperture 408 can be formed in any desired manner, including by drilling or by being formed when the core (or a part of the core) is formed in a mold. Since the formation of a membrane 408A is required, molding is believed to be a more likely alternative for forming aperture 408. The shape and dimension of the core can vary as desired and need not be spherical. While not necessary, the aperture preferably includes an inset or countersunk portion similar to the inset portion 409 illustrated in FIG. 18. The cap or top 400 of the squeaker 307 seats in such inset portion so that the top 400 of the squeaker 307 is flush with the outer surface of the core.

In step 365, adhesive is applied to the exterior of the rubber core, after which a layer of felt is applied in step 366. The core-adhesive-felt combination is heated in step 367, after which an opening is formed in the felt in step 368. The opening is in registration with the aperture formed in the core. The opening is made by cutting through the felt and removing felt from about the aperture. A squeaker 307 is inserted in the opening in the core in step 369. The squeaker 307 punctures membrane 408A and extends into the interior of the rubber core. In step 370, a piece of felt is glued over the top 400 of the squeaker 307 to disguise the location of the squeaker. An iron or other instrument is used in step 371 to flatten and smooth the piece of felt.

The squeaker animal toys depicted in FIGS. 14, 21, 25, and 28 can, if desired, include one or more other openings formed through the wall of the core to receive other squeakers, to receive the end of a rope, and to receive any other object incorporated in the toy.

The squeaker animal toy cores depicted in FIGS. 14, 21, 25, and 28 are substantially hollow. The hollow gas filled interior of each of the cores comprises a large part of the overall volume or space occupied by the core. If desired, the interior of the core of each of the toys—or all or part of the material comprising each core—can consist of foam, of a honeycomb-shaped lattice, of solid rubber or of any other desired material or structure. For example, the spherical (or other shaped) core can be filled with foam or some other material, or, can consist completely of urethane foam, of solid rubber, or of some other material. If desired, a hollow can be formed in or through the solid core to receive a squeaker. Adhesive and a fabric cover are attached to the solid core in the manner earlier described. If desired, felt or another fabric can be attached to a core with an adhesive or other fastening system that does not require heating the fabric or core or adhesive. The core can be pliable or elastic. If a polymer film is used to fabricate all or a part of the core, the foam can be rigid and hard, soft and pliable, elastic; etc. as desired.

Any conventional squeaker can be utilized in a core. One conventional hollow squeaker is self-contained and comprises a bottle-shaped elastic pliable polymer member with a squeaker mounted in the "neck" or "top" of the bottle. The neck is attached to and is in gaseous communication with the hollow body or bladder of the squeaker. When the hollow body of the polymer member is squeezed and compressed from its original shape, air inside the body of the polymer member is forced out through the squeaker to produce sound. When the body is released (after being squeezed), the body elastically returns to its original hollow shape and draws air through the squeaker and back into the body. This kind of conventional squeaker is sometimes used in plush toys.

FIGS. 33 to 36 illustrate a sound module 372 that can be utilized on any animal toy, including a plush toy and the toys described herein, by mounting or placing the sound module anywhere on the toy including, but not limited to, inside the toy, on the exterior of the toy, and partially embedded in the toy.

Module 372 includes a sound generator (not shown). The sound generator includes a motion sensor and a system for randomly selecting one or more sounds and then, when there are two or more sounds selected, combining the sounds and producing the sounds over a speaker in the sound generator. Sound generators that are triggered by motion of the sound generator, by another sound, by an on-off switch, etc. are known and the construction of such is not detailed here. However, a sound generator that is specifically produced for animals toys and that randomly produces and combines sounds to produce a variety of different sounds as described herein apparently is not known.

Figure 33:
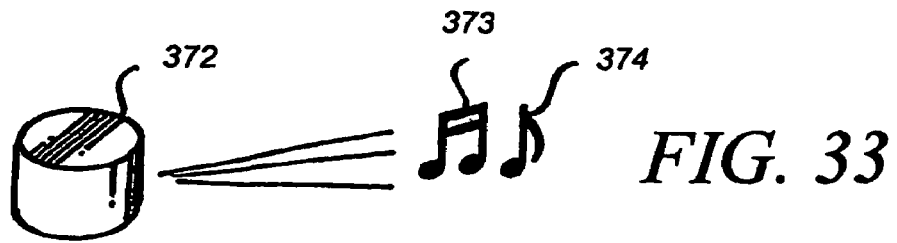
FIG. 33 illustrates the mode of operation of a sound module constructed in accordance with the invention.

In FIG. 33, module 372 has been activated by movement of the toy (not shown) on which module 372 is mounted. Movement of the toy also moved module 372, a motion sensor in module 372 detected the movement, and the motion sensor therefore activated module 372. When module 372 is activated, a software program or other random selection system in module 372 randomly selects the two note sequence 373 consisting of the B below middle C and middle C (the note produced when the middle C key on a piano is struck), and also randomly selects (separate from the random selection of sequence 373) the individual musical note 374 D (the sound produced when the D key that is immediately above the middle C key on a piano is struck). The notes and/or note sequences randomly selected by the software program are chosen from a list of digitally reproduced notes that are stored in memory in module 372, or, if there are a plurality of sound generators in module 372, are chosen from the list of sound generators, or, if a plurality of analog notes are stored in module 372, are chosen from the list of analog notes. Whether the software program randomly selects a single note, a note sequence comprised of two note, a note sequence comprised of three notes, etc. can be randomly determined by the software program. By way of example, the list of digitally reproduced notes maintained in the associated computer memory can correspond to the notes on a piano keyboard. The software program in module 372 can combine selected notes in any desired manner to produce a note pattern and broadcast sound. The manner in which notes are combined to produce a note pattern that is broadcast by module 372 can be randomly determined by the software program. By way of example and not limitation, some ways that the software program can combine the note sequence B,C and the note D selected above to produce a note pattern for broadcast are (1) producing and broadcasting a note pattern in which the three notes B, C, and D are broadcast simultaneously, (2) producing and broadcasting the notes in a pattern in which the notes C-B-D are played one-after-the other, and (3) producing and broadcasting a note pattern in which the C and D notes are played simultaneously followed by the B note. The selected note pattern can be played continuously by repeating the selected note pattern until the sound module 372 is turned off or deactivated, however, the note pattern is typically repeated (or played only once) for a selected limited period of time in the range of one second to sixty seconds. For sake of this discussion, it is assumed that module 372 only plays for a total limited period of time of five seconds the sounds it selects after being activated. Or, after one note pattern is played, the software program can randomly select another different note pattern and produce and broadcast the different note pattern.

Figure 34:
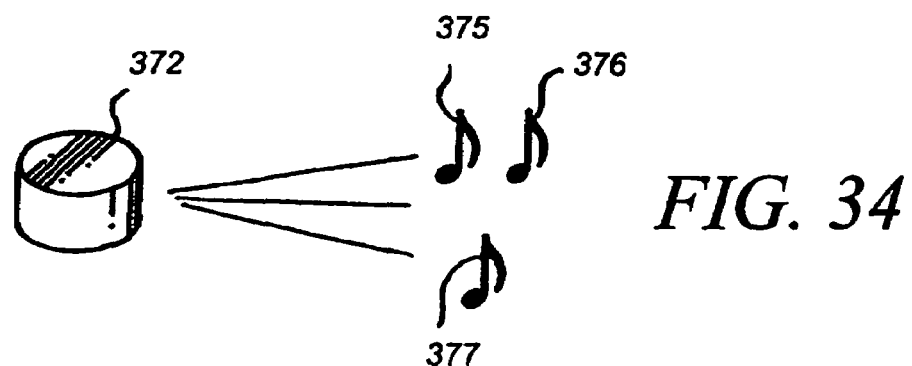
FIG. 34 illustrates an alternate random sound pattern produced by the sound module of FIG. 33.

In FIG. 34, module 372 has again been activated after it was first activated, first played a note pattern one or more times, and after five seconds stopped playing the note pattern or patterns described with respect to FIG. 33. In FIG. 34, the random selection system randomly chose the individual note middle C, then randomly chose the note F ($1^{st}$ F above middle C on a piano), and then randomly chose the note A ($1^{st}$ A above middle C on a piano). Module 372 can combine the selected notes in any desired note pattern (which pattern can be randomly selected) including, by way of example and not limitation, (1) producing and broadcasting a note pattern in which the three notes C, F, A are broadcast simultaneously, (2) producing and broadcasting the notes in a pattern in which the notes C-F-A are played one-after-the other, and (3) producing and broadcasting a note pattern in which the C and F notes are played simultaneously followed by the A note. Module 372 plays the selected pattern(s) for five seconds and then stops broadcasting the notes.

Figure 35:
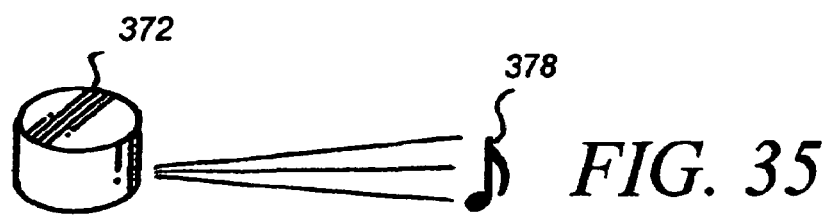
FIG. 35 illustrates a further random sound pattern produced by the sound module of FIG. 34.

In FIG. 35, module 372 has again been activated after it was activated, played notes, and after five seconds stopped playing the note pattern(s) as described with respect to FIG. 34. In FIG. 35, the random selection system has chosen the individual note middle C (the middle C on a piano). Module 372 can play the selected note in any desired randomly selected pattern including, by way of example and not limitation, by (1) producing and broadcasting a note pattern in which the note C is broadcast, (2) producing and broadcasting the notes in a pattern in which the note C is played three successive times as C-C-C, and (3) producing and broadcasting a note pattern in which the note C is played simultaneously with the same note C to produce a C sound with a greater volume than if only a single note C is played. Module 372 plays the selected note for five seconds and then stops broadcasting the note.

Figure 36:
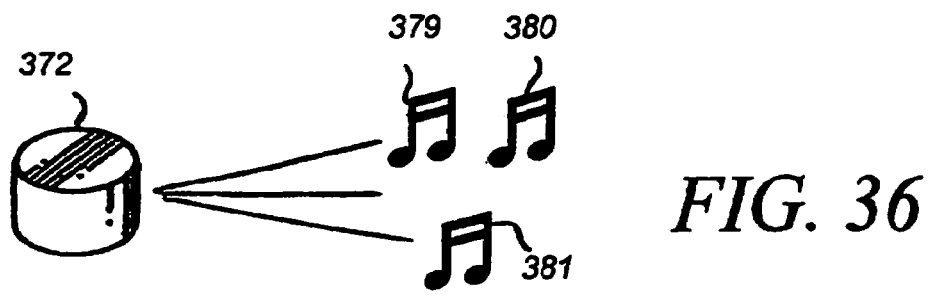
FIG. 36 illustrates another random sound pattern produced by the sound module of FIG. 33.

In FIG. 36, module 372 has again been activated after it was activated, played notes, and after five seconds stopped playing the note pattern(s) as described with respect to FIG. 35. In FIG. 36, the random selection system has chosen several note sequences 379, 380, 381. Sequence 379 is randomly chosen first. The sequence 380 is randomly chosen; then sequence 381. A note sequence comprises two or more notes. Each note in a note sequence can be different from the other notes in the sequence, or, some or all of the notes in a note sequence can be the same as another note in the sequence. The spacing (i.e., the period of time that elapses before a one note in a note sequence is played after another note in the note sequence) can vary as desired. The spacing can be zero if the notes are played simultaneously at exactly the same time, or can be greater than zero. Two notes in a sequence can be identical and played at the same time. If the spacing between two notes is greater than zero, but is still small, a second note can be played while sound from the first note is still being produced and overlaps sound produced when the second note is played. When the time that elapses between the playing of first and second notes in a note sequence is greater than zero, the notes are called successive. The note sequences 379, 380 and 381 are each combinations of two successive notes. Sequence 379 includes two successive different musical notes corresponding in sound to the middle C on a piano and to the D immediately above middle C. The period of time, i.e. the spacing, that elapses between the two successive notes or the notes in any note sequence can vary as desired but usually is fairly short, one-half second or less. Sequence 380 includes two successive different musical notes corresponding to the E and F immediately above the middle C on a piano. Sequence 381 includes two successive musical notes each corresponding to the first G note above the middle C on a piano. Sequence 379 to 381 can be played in succession, one after the other, can be played simultaneously, etc. The software program can randomly alter the spacing between notes in a randomly selected sequence prior to broadcasting the note in the sequence.

Figure 37:
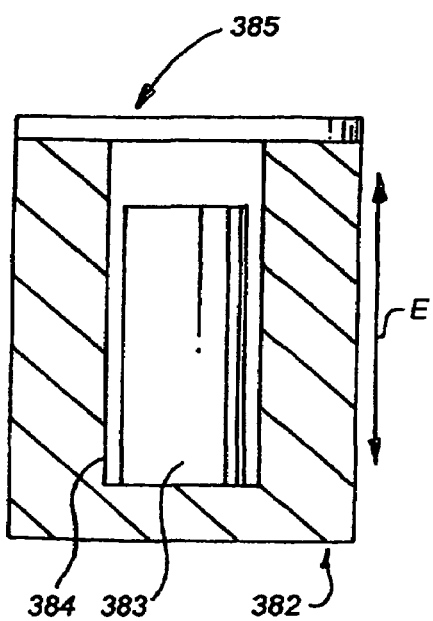
FIG. 37 illustrates an animal toy with a sound module movably stored therein.
Figure 38:
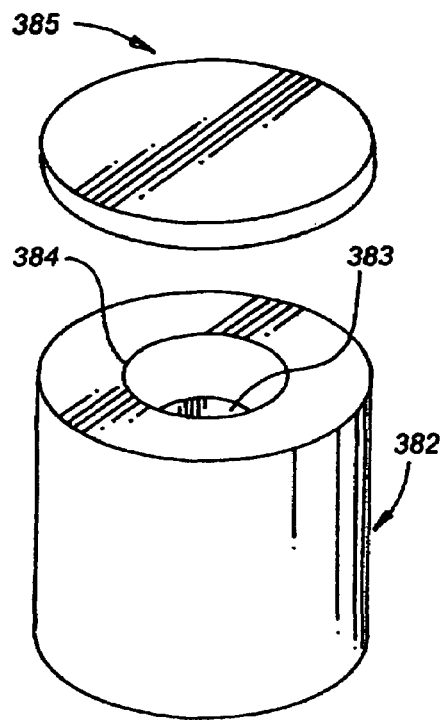
FIG. 38 is an assembly view illustrating the animal toy of FIG. 37.

The animal toy illustrated in FIGS. 37 and 38 includes a hollow body 382 with opening 384 formed therein. Lid 385 is fixedly or detachably secured to the upper end of body 382 in the manner illustrated in FIG. 37 to seal sound module 383 in opening 384. Module 383 is shorter than opening 384 so that when body 382 is moved back and forth in the directions of arrow E, module 383 slides back and forth (up and down) in opening 384. Module 383 includes a motion sensor that, when module 383 slides in opening 384, detects the movement of module 383 and activates module 383 to produce sound. Module 372 or any other sound module or other kind of module (i.e., a module may, instead of or in addition to producing sound, produce light, produce a scent, produce something that can be tasted, or produce something that can be felt by an animal), can be utilized in place of or in combination with module 383.

Figure 39:
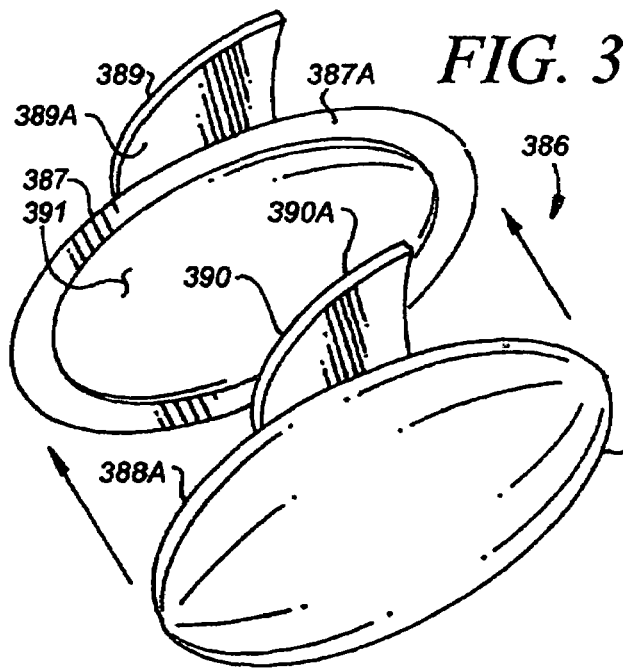
FIG. 39 is an assembly view illustrating the construction of an animal toy in accordance with an alternate embodiment of the invention.

The animal toy 386 illustrated in FIG. 39 includes equivalent hollow halves 387 and 388 that are glued or otherwise fastened together along opposing, flat, oval-shaped edge surfaces 387A and 388A to form an egg-shaped core. The shape and dimension of the core and of halves 387, 388 can vary as desired. Half 387 includes flap 389. Half 388 includes flap 390. Each half 387, 388 can include more than one flap. The shape and dimension of each flap can vary as desired. A flap 389 on one half 387 usually, but not necessarily, corresponds in shape and dimension to an opposing flap 390 on another half 388. A flap 389 on one half or portion 387 may not have an opposing flap 390 on another half or portion 388. Or, toy 386 can be molded or otherwise produced with a unitary core having one or more flaps 398 extending outwardly therefrom.

Figure 40:
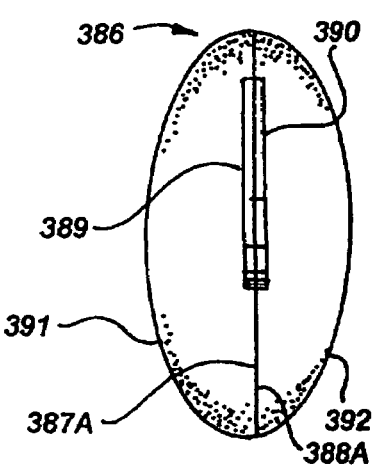
FIG. 40 is a top view illustrating the toy of FIG. 39 assembled and with a felt covering applied thereto.

Flap 389 is equivalent in shape and dimension to flap 390. When halves 387 and 388 are glued or otherwise fastened together, flaps 389 and 390 can be glued together along surfaces 389A and 390A, can be otherwise fastened together, or need not be secured together. Flaps 389 and 390 are preferably, but not necessarily, pliable and bendable. A layer of felt 391 or other fabric is secured to the outer surface of half 387 in the manner earlier described or in any other desired manner. A layer of felt 392 or other fabric is secured to the outer layer of half 388 in the manner earlier described or in any other desired manner. The felt or fabric is presently preferably not secured to any exposed surface of flaps 389 and 390, but can be if desired. The core and flap(s) or other members extending outwardly from the core are preferably, but not necessarily, shaped and dimensioned such that the assembled toy of FIG. 40 looks like or suggests an animal or other object. The appearance of toy of FIG. 40 suggests a fish.

Figure 41:
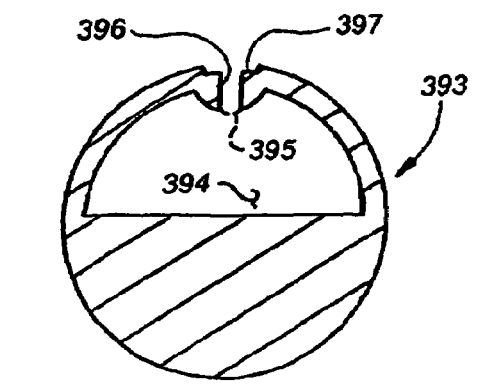
FIG. 41 is a front section view illustrating the construction of an alternate embodiment of the animal toy of the invention.
Figure 42:
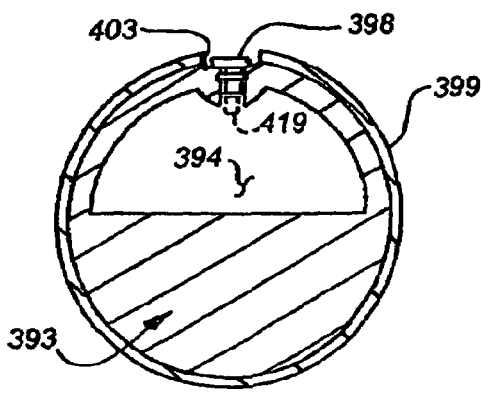
FIG. 42 is a front section view illustrating further construction of the animal toy of FIG. 41.

FIGS. 41 and 42 illustrate construction of an animal toy in which a gas-filled semi-spherical opening 394 is formed in spherical core 393, along with an aperture 396 extending through the core wall to opening 394. Opening 394 can have any desired shape and dimension, as can core 393. Aperture 396 includes countersunk portion 397. If desired, solid thin membrane 395 can extend across the bottom of aperture 396 to help maintain pressure in opening 394 when a layer 399 is compressed onto the outer spherical surface of core 393. Opening 403 is formed in layer 399.

In FIG. 42, squeaker 398 is inserted in aperture 396. Fabric layer 399 is applied before or after squeaker 398 is inserted in aperture 396. If fabric layer 399 is applied to core 393 after squeaker 398 is inserted in aperture 396, squeaker 398 can, if desired, include a plug 419 made of wax or some other material that will melt at 300 degrees F. or some other selected elevated temperature that is greater than ambient temperature, preferably greater than 100 degrees F. Plug 419 prevents air from escaping from opening 394 if compressive pressure is applied to core 393. When layer 399 is applied, adhesive is often applied to core 393 (as earlier described herein) and heat and compressive pressure are applied to layer 399 to bond layer 399 to the outer spherical surface of core 393. When plug 419 is utilized, it is fabricated such that during most of the heating and compression process, the wax prevents air from escaping from opening 394 and prevents the core from collapsing inwardly into opening 394. As the heating and compression process is completed, and the compressive forces are reduced or discontinued, the heat causes the wax plug 419 to melt such that air can travel through squeaker 398 in and out of opening 394. If desired, a small piece of tape can be utilized in place of wax plug 419. The tape adheres to the bottom of and seals squeaker 398. After the heating and compression process for applying layer 399 is complete, a small needle is inserted through the top of squeaker and through squeaker 398 to push the piece of tape off the bottom of squeaker 398 to permit air to flow through the squeaker. Alternatively, a blast of compressed air is directed into the top of squeaker 398 to force the tape off the bottom of the squeaker 398. Any other desired method or apparatus can be utilized to remove the tape from the bottom of the squeaker. If desired, and if the tape and/or wax plug will hold, they tape and/or wax plug can be attached to the top, instead of the bottom, of the squeaker 398.

Figure 43:
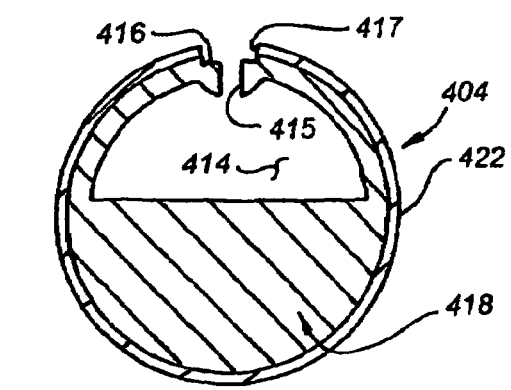
FIG. 43 is a front section view of the construction of another embodiment of the animal toy of the invention.
Figure 44:
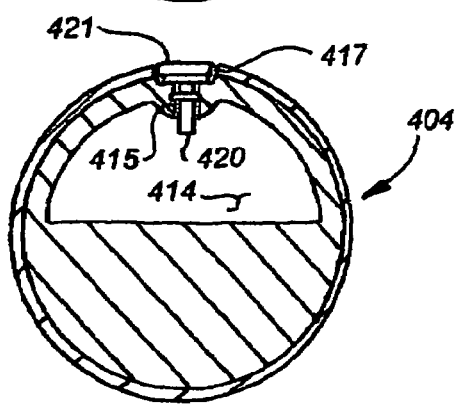
FIG. 44 is a front section view illustrating further construction of the animal toy of FIG. 43.

If fabric layer 399 is applied to core 393 before squeaker 398 is inserted in aperture 396, and membrane 395 is utilized, then membrane 395 functions to prevent air from escaping from opening 394 when core 393 is compressed during the application of layer 399 with compression. After layer 399 is applied, membrane 395 is punctured with a pointed tool before squeaker 398 is inserted. Or, the lower end of squeaker 398 can include a point or cutting edge that punctures membrane 395 FIGS. 43 and 44 illustrate construction of an animal toy in which a semi-spherical opening 414 is formed in spherical core 404, along with an aperture 415 extending through the core wall to opening 414. The shape and dimension of opening 414 and core 404 need not be semi-spherical or spherical, respectively, and can vary as desired. Aperture 415 includes countersunk portion 416. Opening 417 is formed in and through layer 422. Layer 422 is felt or some other fabric or material. In FIG. 44, squeaker 420 is inserted in aperture 415 and a piece 421 of felt or other fabric or material is used to cover and disguise the location of squeaker 420. Any of the methods or structures described herein or any other desired method or structure can be utilized to insert a squeaker 420 in core 404 or inside opening 414.

Figure 45:
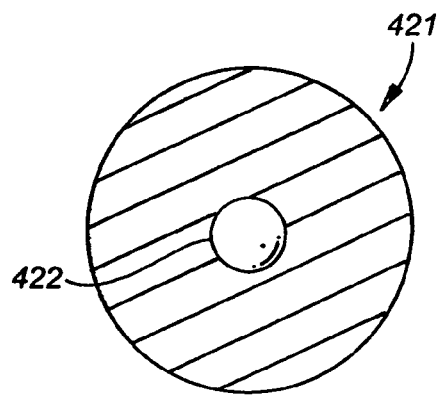
FIG. 45 is a front section view illustrating construction of still a further embodiment of the animal toy of the invention.
Figure 46:
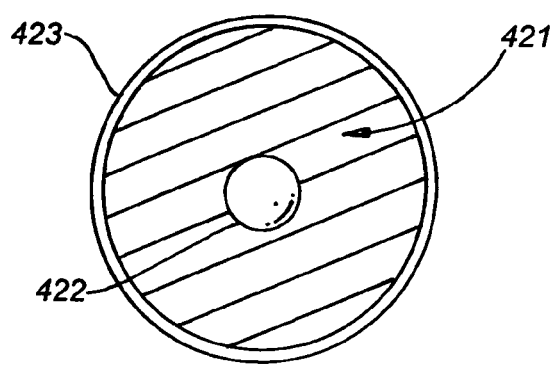
FIG. 46 is a front section view illustrating further construction of the animal toy of FIG. 45.
Figure 47:
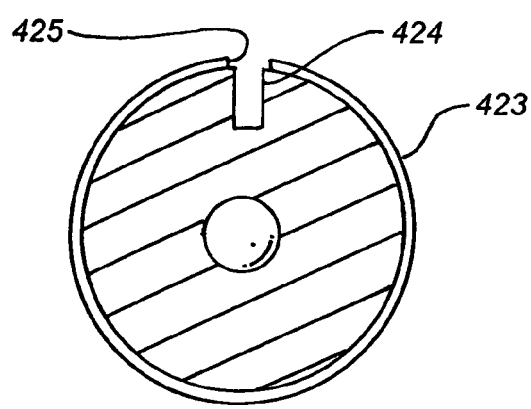
FIG. 47 is a front section view illustrating still further construction of the animal toy of FIG. 46.
Figure 48:
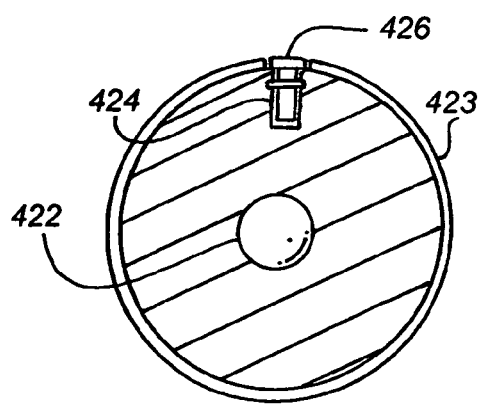
FIG. 48 is a front section view illustrating yet still further construction of the animal toy of FIG. 45; and, FIG. 49 is a partial section and perspective view illustrating an alternate embodiment of the animal toy of the invention.

FIGS. 45 to 48 illustrate the assembly of an animal toy in accordance with another embodiment of the invention. FIG. 45 illustrates a solid spherical core 421 with a sound module 422 at the center. Core 421 can be formed in any desired manner, but it is presently preferred that module 422 be placed at the center of an empty spherical mold and that a polymer powder be placed in the mold and activated to expand, fill the mold, and encase the module 422 in the manner illustrated in FIG. 45. An aperture(s) can be formed through core 421 extending from the outer surface of core 421 to module 422. In FIG. 46, a layer 423 of felt or other fabric has been applied to the outer spherical surface of the core. Any desired method is utilized to apply and secure the layer 423 to core 421. In FIG. 47, aperture 424 is formed through layer 423 and into core 421. In FIG. 48, squeaker 426 is inserted in aperture 424. The shape and dimension of core 421 can vary as desired.

Figure 49:
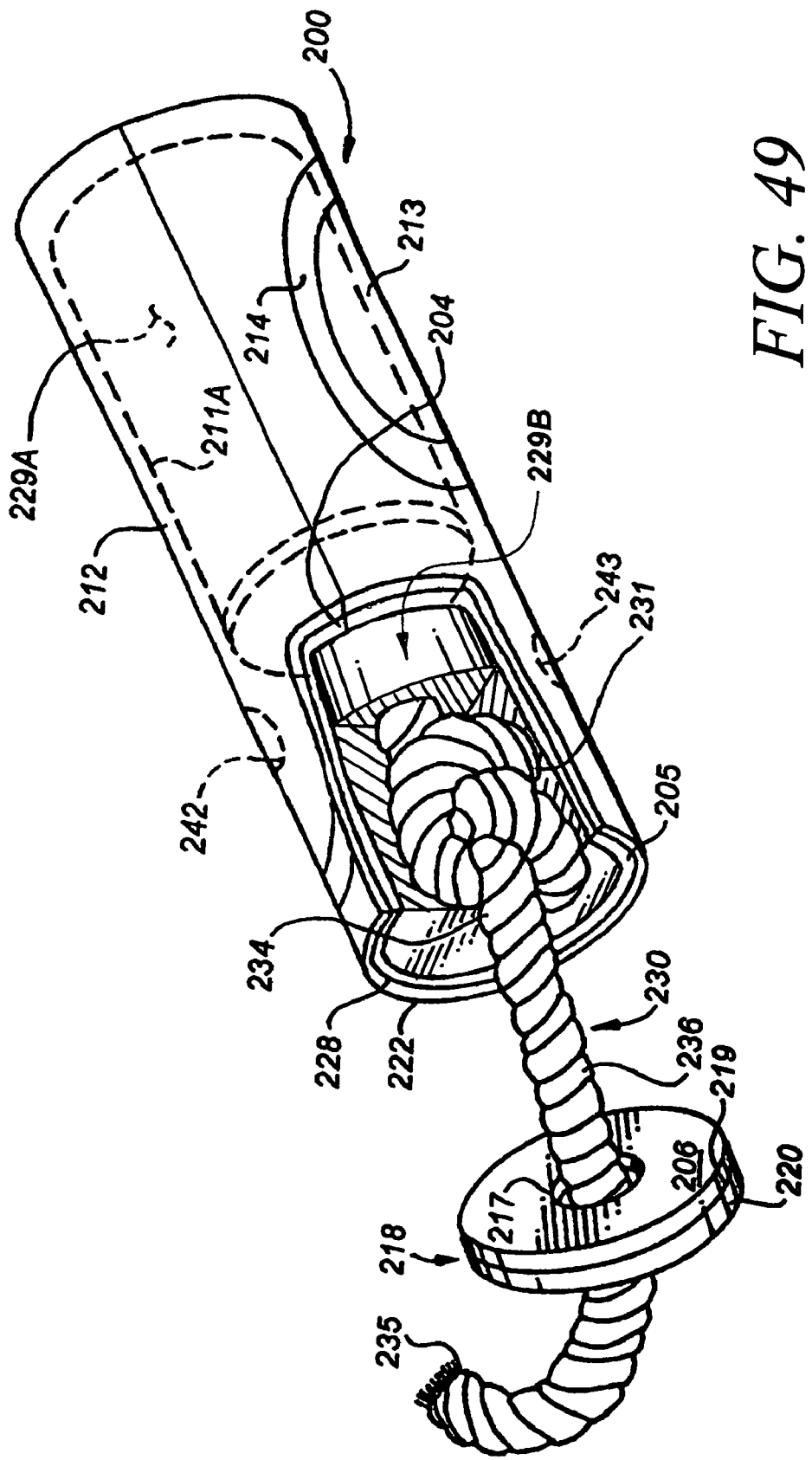

FIG. 49 illustrates the use of foam, solid rubber, or some other material 229B to embed and anchor the knot 231 or end of a rope 234 in an animal toy 200. Foam 229B includes flat circular end 211A. Toy 200 can take on any shape and dimension, need not include a felt cover, need not include a hollow gas filled compartment 229A (i.e., toy 200 can be completely solid with knot 231 embedded therein), etc.

Having set forth the presently preferred embodiments of my invention in such terms as to enable those skilled in the art to make and use the invention, I claim:

1. An animal throw toy comprising
   (a) a compressibly elastically deformable hollow thin-walled rubber core sealingly circumscribing and enclosing a selected gaseous volume and including
      (i) a center,
      (ii) a first compressibly elastically deformable hollow sealed compartment with a compressible portion of said gaseous volume therein,
      (iii) a second hollow compartment adjacent, spaced apart from, and separate from said first sealed compartment, said second compartment having a first inner volume and a second inner volume,
      (iv) a wall extending around said first and second compartments and including an outer surface;
   (b) a rope having
      (i) a first distal end extending outwardly from said second hollow compartment to be grasped to throw the toy, and
      (ii) a second proximate end embedded in and filling said first inner volume of said second hollow compartment of said core; and,
   (c) a fabric cover affixed to said outer surface of said core and having a selected thickness.

2. The toy of claim 1 wherein said core includes
   (a) a first portion substantially comprising a first half of said core; and,
   (b) a second portion connected to said first portion and substantially comprising a second half of said core.

3. The toy of claim 2 wherein said fabric cover comprises a plurality of fibers forming a soft compressible layer adjacent said outer surface.

4. The toy of claim 2 wherein said fabric cover comprises a firm woven cloth heavily napped and shrunk to produce a smooth resilient texture.

5. The toy of claim 2 including at least one elongate strip of material extending over said outer surface as a line of demarcation to separate said felt cover into at least two areas, one on either side of said strip of material.

6. The toy of claim 2 wherein a gas fills said second inner volume of said second compartment of said core.

7. The toy of claim 2 wherein a solid fills said second inner volume of said second compartment of said core.

8. The toy of claim 7 wherein said solid comprises rubber.

9. The toy of claim 1 wherein said fabric cover comprises a plurality of fibers forming a soft compressible layer adjacent said outer surface.

10. The toy of claim 1 wherein said fabric cover comprises a firm woven cloth heavily napped and shrunk to produce a smooth resilient texture.

11. The toy of claim 1 including at least one elongate strip of material extending over said outer surface as a line of demarcation to separate said felt cover into at least two areas, one on either side of said strip of material.

12. The toy of claim 1 wherein a gas fills said second inner volume of said second compartment of said core.

13. The toy of claim 1 wherein a solid fills said second inner volume of said second compartment of said core.

14. The toy of claim 13 wherein said solid comprises rubber.

* * * * *